(12) United States Patent
Antonsson et al.

(10) Patent No.: US 11,620,161 B2
(45) Date of Patent: Apr. 4, 2023

(54) COMPUTING TASK COINCIDENCE REDUCTION VIA PRIME SCHEDULING

(71) Applicant: Volvo Car Corporation, Gothenburg (SE)

(72) Inventors: Anders Bertil Antonsson, Västra Frölunda (SE); Lennart Casparsson, Lerum (SE)

(73) Assignee: VOLVO CAR CORPORATION, Gothenburg (SE)

( * ) Notice: Subject to any disclaimer, the term of this patent is extended or adjusted under 35 U.S.C. 154(b) by 95 days.

(21) Appl. No.: 17/188,293

(22) Filed: Mar. 1, 2021

(65) Prior Publication Data

US 2022/0276896 A1 Sep. 1, 2022

(51) Int. Cl.
*G06F 9/46* (2006.01)
*G06F 9/48* (2006.01)

(52) U.S. Cl.
CPC .................. *G06F 9/4887* (2013.01)

(58) Field of Classification Search
CPC .................................................. G06F 9/4887
See application file for complete search history.

(56) References Cited

U.S. PATENT DOCUMENTS 8,059,629 B1 11/2011 Pister

FOREIGN PATENT DOCUMENTS

| CN | 105813164 B | 12/2018 |
| CN | 105813158 B | 1/2019 |

OTHER PUBLICATIONS

Audsley et al. | On fixed priority scheduling, offsets and co-prime task periods. Real-Time Systems Research Group, University of York, Department of Computer Science, Heslington, York YOIO .5DD, UK Received Aug. 16, 1997; received in revised form May 13, 1998, 5 pages.
Yomsi et al. | Controller Area Network (CAN): Response Time Analysis with Offsets, 2012, 10 pages. 10.1109/WFCS.2012. 6242539.
Davis et al. | Traffic Shaping to Reduce Jitter in Controller Area Network (CAN. ACM SIGBED Review, Nov. 2012, 4 pages.
Grenier et al. | Pushing the limits of CAN—scheduling frames with offsets provides a major performance boost. 4th European Congress on Embedded Real Time Software (ERTS 2008), 2008, Toulouse, France, inria-00273946, 9 pages.
Szakaly A. | Response time analysis with offeets for CAN. Department of Computer Engineering, Chalmers University of Technology, Göteborg, Sweden, Nov. 2003, 67 pages.
Davis et al. | Transferring Real-Time Systems Research into Industrial Practice: Four Impact Case Studies, 30th Euromicro Conference on Real-Time Systems (ECRTS 2018), 24 pages.

*Primary Examiner* — Gregory A Kessler
(74) *Attorney, Agent, or Firm* — Amin, Turocy & Watson, LLP

(57) ABSTRACT

Systems and techniques that facilitate computing task coincidence reduction via prime scheduling are provided. In various embodiments, a system can comprise an input component that can access a periodic computing task performed by a computer system. In various instances, the system can further comprise a prime component that can assign a time period to the periodic computing task. In various cases, a duration of the time period can be a product of a common tick and a prime number. In various embodiments, the system can comprise an execution component that can periodically execute the periodic computing task according to the time period.

20 Claims, 20 Drawing Sheets

Example of Computing Task Scheduling: Before Prime Scheduling

| Periodic Computing Task | Common Tick (ms) | Integer Multiplier | Time Period (ms) | Hyperperiod (s) | Ticks in Hyperperiod |
|---|---|---|---|---|---|
| Task A | 5 | 2 | 10 | 63.0 | 12600 |
| Task B | 5 | 5 | 25 | | |
| Task C | 5 | 14 | 70 | | |
| Task D | 5 | 20 | 100 | | |
| Task E | 5 | 36 | 180 | | |
| Task F | 5 | 50 | 250 | | |
| Task G | 5 | 200 | 1000 | | |

Example of Computing Task Scheduling: After Prime Scheduling

| Periodic Computing Task | Common Tick (ms) | Integer Multiplier | Time Period (ms) | Hyperperiod (s) | Ticks in Hyperperiod |
|---|---|---|---|---|---|
| Task A | 5 | 2 | 10 | 35807796.1 | 7161592110 |
| Task B | 5 | 5 | 25 | | |
| Task C | 5 | 13 | 65 | | |
| Task D | 5 | 19 | 95 | | |
| Task E | 5 | 31 | 155 | | |
| Task F | 5 | 47 | 235 | | |
| Task G | 5 | 199 | 995 | | |

FIG. 10

Task Coincidence Reduction Due to Prime Scheduling

| Tasks Performed in Same Tick | Frequency Before Prime Scheduling | Frequency After Prime Scheduling | Percent Change |
|---|---|---|---|
| 0 | 286463684 | 236079360 | -17.588 |
| 1 | 303515093 | 342081792 | 12.707 |
| 2 | 76845022 | 121049136 | 57.524 |
| 3 | 34330170 | 15971424 | -53.477 |
| 4 | 10117171 | 950800 | -90.602 |
| 5 | 3978662 | 26388 | -99.337 |
| 6 | 852570 | 309 | -99.964 |
| 7 | 56838 | 1 | -99.998 |
| Sum of Ticks | 716159210 | 716159210 | |

1102

Tick Intervals Between Task Coincidences

| Tasks Performed in Same Tick | Minimum Interval Before Prime Scheduling (Worst Case) | Maximum Interval Before Prime Scheduling (Best Case) | Minimum Interval After Prime Scheduling (Worst Case) | Maximum Interval After Prime Scheduling (Best Case) | Percent Change For Minimum Interval |
|---|---|---|---|---|---|
| 0 | 1 | 1 | 1 | 1 | 0.00 |
| 1 | 1 | 2 | 1 | 2 | 0.00 |
| 2 | 2 | 10 | 1 | 10 | -50.00 |
| 3 | 2 | 20 | 1 | 130 | -50.00 |
| 4 | 10 | 100 | 2 | 2470 | -80.00 |
| 5 | 20 | 200 | 130 | 76570 | 550.00 |
| 6 | 200 | 1400 | 76570 | 3598790 | 38185.00 |
| 7 | 12600 | 12600 | 716159210 | 716159210 | 5683703.25 |

Example of Computing Task Scheduling: Before Prime Scheduling

| Periodic Computing Task | Common Tick (ms) | Integer Multiplier | Time Period (ms) | Hyperperiod (s) | Ticks in Hyperperiod |
|---|---|---|---|---|---|
| Task A | 5 | 2 | 10 | 46.2 | 9240 |
| Task B | 5 | 3 | 15 | | |
| Task C | 5 | 6 | 30 | | |
| Task D | 5 | 11 | 55 | | |
| Task E | 5 | 28 | 140 | | |
| Task F | 5 | 120 | 600 | | |

Example of Computing Task Scheduling: Before Prime Scheduling

| Periodic Computing Task | Common Tick (ms) | Integer Multiplier | Time Period (ms) | Hyperperiod (s) | Ticks in Hyperperiod |
|---|---|---|---|---|---|
| Task A | 5 | 2 | 10 | 4288.4 | 857670 |
| Task B | 5 | 3 | 15 | | |
| Task C | 5 | 5 | 25 | | |
| Task D | 5 | 11 | 55 | | |
| Task E | 5 | 23 | 115 | | |
| Task F | 5 | 113 | 565 | | |

Task Coincidence Reduction Due to Prime Scheduling

| Tasks Performed in Same Tick | Frequency Before Prime Scheduling | Frequency After Prime Scheduling | Percent Change |
|---|---|---|---|
| 0 | 259900 | 197120 | -24.155 |
| 1 | 397275 | 375392 | -5.508 |
| 2 | 55694 | 226888 | 307.383 |
| 3 | 116955 | 53292 | -54.434 |
| 4 | 25432 | 4826 | -81.024 |
| 5 | 2322 | 151 | -93.497 |
| 6 | 92 | 1 | -98.913 |
| Sum of Tasks | 857670 | 857670 | |

1302

Tick Intervals Between Task Coincidences

| Tasks Performed in Same Tick | Minimum Interval Before Prime Scheduling (Worst Case) | Maximum Interval Before Prime Scheduling (Best Case) | Minimum Interval After Prime Scheduling (Worst Case) | Maximum Interval After Prime Scheduling (Best Case) | Percent Change For Minimum Interval |
|---|---|---|---|---|---|
| 0 | 1 | 1 | 1 | 1 | 0.00 |
| 1 | 1 | 2 | 1 | 2 | 0.00 |
| 2 | 1 | 6 | 1 | 6 | 0.00 |
| 3 | 2 | 6 | 1 | 30 | -50.00 |
| 4 | 6 | 66 | 6 | 330 | 0.00 |
| 5 | 84 | 840 | 330 | 759 | 292.86 |
| 6 | 9240 | 9240 | 857670 | 857670 | 9182.14 |

| Example of Computing Task Scheduling: Before Prime Scheduling |||| 
|---|---|---|---|
| Periodic Computing Task | Common Tick (ms) | Integer Multiplier | Time Period (ms) |
| Task 1 | 5 | 2 | 10 |
| Task 2 | 5 | 3 | 15 |
| Task 3 | 5 | 3 | 15 |
| Task 4 | 5 | 3 | 15 |
| Task 5 | 5 | 3 | 15 |
| Task 6 | 5 | 3 | 15 |
| Task 7 | 5 | 4 | 20 |
| Task 8 | 5 | 4 | 20 |
| Task 9 | 5 | 6 | 30 |
| Task 10 | 5 | 6 | 30 |
| Task 11 | 5 | 6 | 30 |
| Task 12 | 5 | 8 | 40 |
| Task 13 | 5 | 10 | 50 |
| Task 14 | 5 | 10 | 50 |
| Task 15 | 5 | 10 | 50 |
| Task 16 | 5 | 11 | 55 |
| Task 17 | 5 | 11 | 55 |
| Task 18 | 5 | 11 | 55 |
| Task 19 | 5 | 12 | 60 |
| Task 20 | 5 | 14 | 70 |
| Task 21 | 5 | 16 | 80 |
| Task 22 | 5 | 22 | 110 |
| Task 23 | 5 | 22 | 110 |
| Task 24 | 5 | 22 | 110 |
| Task 25 | 5 | 30 | 150 |
| Task 26 | 5 | 30 | 150 |
| Task 27 | 5 | 32 | 160 |
| Task 28 | 5 | 36 | 180 |
| Task 29 | 5 | 40 | 200 |
| Task 30 | 5 | 60 | 300 |
| Task 31 | 5 | 66 | 330 |
| Task 32 | 5 | 70 | 350 |
| Task 33 | 5 | 80 | 400 |
| Task 34 | 5 | 84 | 420 |
| Task 35 | 5 | 100 | 500 |
| Task 36 | 5 | 116 | 580 |
| Task 37 | 5 | 130 | 650 |
| Task 38 | 5 | 140 | 700 |
| Task 39 | 5 | 140 | 700 |
| Task 40 | 5 | 154 | 770 |
| Task 41 | 5 | 190 | 950 |
| Task 42 | 5 | 200 | 1000 |
| Task 43 | 5 | 200 | 1000 |
| Hyperperiod (s) | | 19855836 | |

FIG. 14

| Example of Computing Task Scheduling: After Prime Scheduling |||| 
|---|---|---|---|
| Periodic Computing Task | Common Tick (ms) | Integer Multiplier | Time Period (ms) |
| Task 1 | 5 | 2 | 10 |
| Task 2 | 5 | 3 | 15 |
| Task 3 | 5 | 3 | 15 |
| Task 4 | 5 | 3 | 15 |
| Task 5 | 5 | 3 | 15 |
| Task 6 | 5 | 3 | 15 |
| Task 7 | 5 | 4 | 20 |
| Task 8 | 5 | 4 | 20 |
| Task 9 | 5 | 6 | 30 |
| Task 10 | 5 | 6 | 30 |
| Task 11 | 5 | 6 | 30 |
| Task 12 | 5 | 8 | 40 |
| Task 13 | 5 | 10 | 50 |
| Task 14 | 5 | 10 | 50 |
| Task 15 | 5 | 10 | 50 |
| Task 16 | 5 | 11 | 55 |
| Task 17 | 5 | 11 | 55 |
| Task 18 | 5 | 11 | 55 |
| Task 19 | 5 | 11 | 55 |
| Task 20 | 5 | 13 | 65 |
| Task 21 | 5 | 13 | 65 |
| Task 22 | 5 | 17 | 85 |
| Task 23 | 5 | 19 | 95 |
| Task 24 | 5 | 19 | 95 |
| Task 25 | 5 | 23 | 115 |
| Task 26 | 5 | 29 | 145 |
| Task 27 | 5 | 31 | 155 |
| Task 28 | 5 | 31 | 155 |
| Task 29 | 5 | 37 | 185 |
| Task 30 | 5 | 59 | 295 |
| Task 31 | 5 | 61 | 305 |
| Task 32 | 5 | 67 | 335 |
| Task 33 | 5 | 79 | 395 |
| Task 34 | 5 | 83 | 415 |
| Task 35 | 5 | 97 | 485 |
| Task 36 | 5 | 113 | 565 |
| Task 37 | 5 | 127 | 635 |
| Task 38 | 5 | 139 | 695 |
| Task 39 | 5 | 139 | 695 |
| Task 40 | 5 | 151 | 755 |
| Task 41 | 5 | 181 | 905 |
| Task 42 | 5 | 197 | 985 |
| Task 43 | 5 | 199 | 995 |
| Hyperperiod (s) | | 7.33397E+36 | |

FIG. 15

Task Coincidence Reduction Due to Prime Scheduling (1602)

| Tasks Performed in Same Tick | Frequency Before Prime Scheduling | Frequency After Prime Scheduling | Percent Change |
|---|---|---|---|
| 0 | 4444831142 | 2793668854 | -37.1479 |
| 1 | 1523942106 | 1941279597 | 27.3854 |
| 2 | 253990351 | 939077562 | 269.7296 |
| 3 | 1180179303 | 958829034 | -18.7556 |
| 4 | 849908516 | 1393931711 | 64.0096 |
| 5 | 2531437761 | 1989890644 | -21.3929 |
| 6 | 409079419 | 865520668 | 111.5777 |
| 7 | 253058671 | 639247495 | 152.6084 |
| 8 | 294780217 | 278215297 | -5.6194 |
| 9 | 872502773 | 804635271 | -7.7785 |
| 10 | 253960213 | 257897427 | 1.5503 |
| 11 | 99580316 | 459580746 | 361.5177 |
| 12 | 304469472 | 550115971 | 80.6802 |
| 13 | 279385129 | 256992717 | -8.0149 |
| 14 | 364815110 | 197030036 | -45.9918 |
| 15 | 173562347 | 159688189 | -7.9938 |
| 16 | 165379613 | 97632007 | -40.9649 |
| 17 | 29959934 | 40313217 | 34.5571 |
| 18 | 64734862 | 23338496 | -63.9476 |
| 19 | 66646970 | 13441127 | -79.8324 |
| 20 | 59384947 | 4734194 | -92.0280 |
| 21 | 46209597 | 2139993 | -95.3689 |
| 22 | 29798137 | 551638 | -98.1488 |
| 23 | 38423164 | 153954 | -99.5993 |
| 24 | 23717850 | 153954 | -99.3509 |
| 25 | 16202670 | 5461 | -99.9663 |
| 26 | 11758414 | 625 | -99.9947 |
| 27 | 7515367 | 29 | -99.9996 |
| 28 | 5749079 | 0 | -100.0000 |
| 29 | 3281098 | 0 | -100.0000 |
| 30 | 3058083 | 0 | -100.0000 |
| 31 | 2665575 | 0 | -100.0000 |
| 32 | 1435085 | 0 | -100.0000 |
| 33 | 1049728 | 0 | -100.0000 |
| 34 | 471177 | 0 | -100.0000 |
| 35 | 241630 | 0 | -100.0000 |
| 36 | 391768 | 0 | -100.0000 |
| 37 | 198199 | 0 | -100.0000 |
| 38 | 71546 | 0 | -100.0000 |
| 39 | 76158 | 0 | -100.0000 |
| 40 | 34496 | 0 | -100.0000 |
| 41 | 4544 | 0 | -100.0000 |
| 42 | 228 | 0 | -100.0000 |
| 43 | 3 | 0 | -100.0000 |
| Sum of Ticks | 14667942768 | 14667942768 | |

FIG. 16

COMPUTING TASK COINCIDENCE REDUCTION VIA PRIME SCHEDULING

TECHNICAL FIELD

The subject disclosure relates to computing tasks, and more specifically to computing task coincidence reduction via prime scheduling.

BACKGROUND

Modern computing systems, especially in-vehicle computing systems, can be refreshed at regular time intervals during operation. The regular time interval between refresh events can be referred to as a tick and/or a common tick. During a tick, a computing system can perform one or more periodic computing tasks. A periodic computing task can be any suitable operation, process, function, computation, data transmission, and/or data reception which a computing system executes and/or facilitates on a periodic basis. It is often the case that a time period associated with a periodic computing task can be expressed as an integer multiple of the common tick.

In various instances, the workload of the computing system during any given tick can be proportional to the number of periodic computing tasks that the computing system performs during the given tick. In various cases, the computing system can perform different numbers of periodic computing tasks in different ticks. Accordingly, the workload of the computing system can vary across ticks. If two or more periodic computing tasks are performed in a given tick, those two or more periodic computing tasks can be considered as coinciding, and such an instance can be referred to as a computing task coincidence.

As the number of periodic computing tasks that are involved in a computing task coincidence increases, the computing system can be become overloaded. Conventionally, the problem of computing task coincidences is addressed by either reducing the number of periodic computing tasks which the computing system is configured to perform, by introducing start-time offsets, or by making available more computational resources to the computing system. Unfortunately, reducing the number of periodic computing tasks reduces the functionality of the computing system, start-time offsets are not normally supported by state-of-the-art automotive software, and making available more computational resources is expensive. Thus, systems and/or techniques that can ameliorate the problem of computing task coincidences without sacrificing functionality and without increased expense can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate computing task coincidence reduction via prime scheduling are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise an input component that can access a periodic computing task performed by a computing system. In various embodiments, the computer-executable components can further comprise a prime component, which can assign a time period to the periodic computing task. In various cases, a duration of the time period can be a product of a common tick and a prime number.

According to one or more embodiments, the above-described system can be implemented as a computer-implemented method and/or computer program product.

DESCRIPTION OF THE DRAWINGS

FIGS. 10-11 illustrate example, non-limiting tables of results that demonstrate benefits of computing task coincidence reduction via prime scheduling in accordance with one or more embodiments described herein.

FIGS. 12-13 illustrate example, non-limiting tables of results that demonstrate benefits of computing task coincidence reduction via prime scheduling in accordance with one or more embodiments described herein.

FIGS. 14-16 illustrate example, non-limiting tables of results that demonstrate benefits of computing task coincidence reduction via prime scheduling in accordance with one or more embodiments described herein.

DETAILED DESCRIPTION

Figure 1:
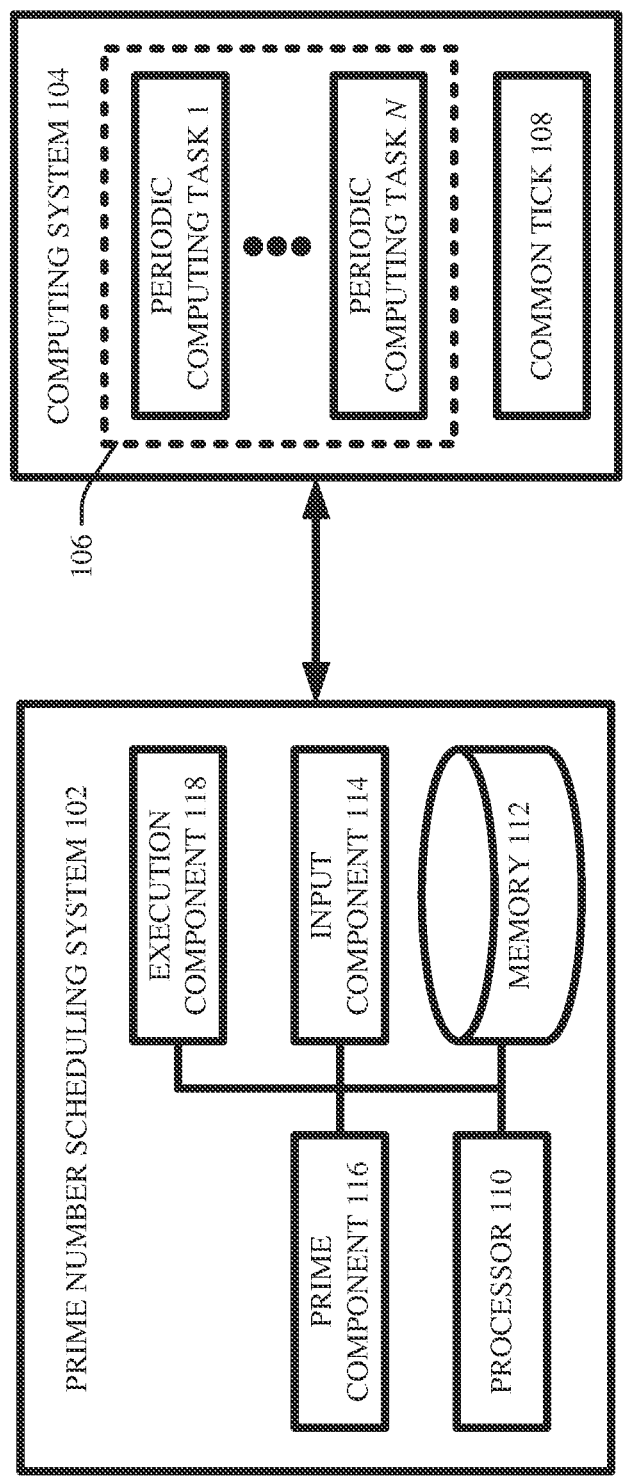
FIG. 1 illustrates a block diagram of an example, non-limiting system that facilitates computing task coincidence reduction via prime scheduling in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, modern computing systems, especially computing systems that are integrated into a vehicle, can be automatically refreshed at regular time intervals during operation. For example, a computing system can experience a refresh event every 5 milliseconds (ms). The regular time interval between these refresh events can be referred to as a tick and/or a common tick.

During a tick, a computing system can perform one or more periodic computing tasks, as well as one or more aperiodic computing tasks. A periodic computing task can be any suitable operation, process, function, computation, data transmission, and/or data reception which a computing system executes and/or facilitates on a periodic basis. An aperiodic computing task can be any suitable operation, process, function, computation, data transmission, and/or data reception which a computing system executes and/or facilitates on an ad hoc basis.

It is often the case that a time period associated with a periodic computing task can be expressed as an integer multiple of the common tick. For instance, a periodic computing task A can have a time period of 15 ms. That is, the computing system can perform and/or facilitate the periodic computing task A every 15 ms. If the common tick is 5 ms, then the time period of the periodic computing task A can be considered as 3 ticks (e.g., because 15 ms÷5 ms/tick=3 ticks).

In various instances, the workload of the computing system during any given tick can be proportional to the number of periodic computing tasks that the computing system performs during that given tick. For example, consider again a periodic computing task A that has a time period of 3 ticks, and also consider a periodic computing task B that has a time period of 2 ticks. In such case, the computing system would perform the periodic computing task A every three ticks and the periodic computing task B every two ticks. Thus, if the computing system performs both the periodic computing task A and the periodic computing task B during tick 0, then the computing system would proceed as follows: perform neither A nor B during tick 1, perform B but not A during tick 2, perform A but not B during tick 3, perform B but not A during tick 4, perform neither A nor B during tick 5, perform both A and B during tick 6, and so on. Thus, the workload of the computing system can vary from tick to tick.

As those having ordinary skill in the art will appreciate, the common tick can be implemented in any suitable fashion. For example, in some cases, the common tick can be implemented by a single task scheduler and/or timer. For instance, to continue the above example, a single task scheduler/timer can count ticks of 5 ms, can dispatch the periodic computing task A at every third tick, and/or can dispatch the periodic computing task B at every second tick. As another example, in some cases, the common tick can be implemented by multiple task schedulers and/or timers. For instance, to continue the above example, a first task scheduler/timer can count ticks of 5 ms and can dispatch the periodic computing task A at every third tick, and a second task scheduler/timer can count ticks of 5 ms and can dispatch the periodic computing task B at every second tick. In such case, the periodic computing task A and the periodic computing task B can be said to have a common tick, since the tick of the first task scheduler/timer is identical in duration to the tick of the second task scheduler/timer (e.g., both are set to 5 ms). In various instances, however, different task schedulers/timers can implement ticks of different durations. For example, a first task scheduler/timer can count ticks of 15 ms and can dispatch the periodic computing task A at every such tick (e.g., every 15 ms), and a second task scheduler/timer can count ticks of 10 ms and can dispatch the periodic computing task B at every such tick (e.g., every 10 ms). Furthermore, in some cases, a given task scheduler/timer can be configured to dispatch more than one periodic computing task. For instance, a first task scheduler/time can dispatch the periodic computing task A and the periodic computing task B according to their respective time periods; a second task scheduler/timer can dispatch a periodic computing task C, a periodic computing task D, and a periodic computing task E according to their respective time periods; and a third task scheduler/timer can dispatch a periodic computing task F according to its respective time period. In various aspects, any suitable number of task schedulers/timers can be implemented to dispatch any suitable number of periodic computing tasks.

If two or more periodic computing tasks are performed in a given tick, those two or more periodic computing tasks can be considered as coinciding, and such an instance can be referred to as a coincidence and/or a computing task coincidence. For instance, in the above example, there is at least a two-task coincidence at tick 0, tick 6, and every sixth tick thereafter. In other words, in this non-limiting example where two periodic computing tasks are implemented, a task period of 2 ticks and a task period of 3 ticks results in a hyperperiod (e.g., least common multiple) of 6 ticks. As the number of periodic computing tasks that are involved in a computing task coincidence increases, the computing system can be become overloaded, which is a technical problem. For example, if the computing system performs too many periodic computing tasks during a given tick, the computing system can experience increased time delays, excessive consumption of computational resources, and/or can be unable to timely handle the execution of ad hoc tasks.

Conventionally, the problem of computing task coincidences is addressed by either reducing the total number of periodic computing tasks which the computing system is configured to perform (e.g., by eliminating features which the computing system provides to clients), by introducing start-time offsets (e.g., delaying and/or staggering the start of the periodic execution of one or more periodic computing tasks), or by making available more computational resources to the computing system (e.g., by employing a greater number of processors, by employing more powerful processors, by allowing more time for the periodic computing tasks to be facilitated). Unfortunately, reducing the total number of periodic computing tasks reduces the functionality of the computing system, start-time offsets are not supported by various types of computing systems (e.g., especially in-vehicle computing systems), and making additional computational resources available is costly. Thus, systems and/or techniques that can ameliorate the problem of computing task coincidences without reducing functionality and without increased expense can be desirable.

In-vehicle electronic control units (ECUs) present a real-world example of the problems of computing task coincidences. Modern vehicles can include tens or hundreds of ECUs that communicate with each other over a large number of communication busses (e.g., controller area network (CAN) busses, time trigger controller area network (TT-CAN) busses, local interconnect network (LIN) busses, FlexRay busses, Single Edge Nibble Transmission (SENT) busses, 10Base busses, T1S busses, Ethernet busses, Gigabit Ethernet busses, Scalable Service-Oriented Middleware Over IP (SOME/IP) busses). Data can be transferred over a communication bus in packages, often referred to as frames and/or data frames. A data frame can contain the communicated data, addressing information, and/or a checksum. Data generated by one ECU of a vehicle system can be consumed in a different ECU of the vehicle system, which means that such data is transferred back and forth over communication busses and between various ECUs. In various cases, an ECU that is connected to more than one communication bus can be referred to as a gateway ECU. A gateway ECU can facilitate the receiving, repacking, and/or transmitting of data frames, which can consume large amounts of computing power and/or time.

As mentioned above, the software in an ECU can be automatically refreshed at regular intervals, referred to as ticks. During a tick, a gateway ECU that is transmitting data frames from a first bus to a second bus can perform the following actions. Frames that have entered, during the previous tick, the receive buffers of the bus protocol controller of the first bus can be downloaded into the random access memory (RAM) cache of the gateway ECU. Next, for each incoming frame from the first bus with a destination on the second bus, the gateway ECU can extract all pieces of data and can write each piece of data into its allotted position in the outgoing frame of the RAM cache. Then, the ECU can upload frames scheduled for transmission during the next tick from the RAM cache to the transmit buffers of the bus protocol controller of the second bus. This example highlights frame transmission from one bus to another. As those having ordinary skill in the art will appreciate, however, gateway ECUs can transmit any suitable number of data frames from any suitable number of first busses to any suitable number of second busses (e.g., bi-directional and/or multi-directional data transmission).

In various cases, the periodic transmission and/or reception of such data frames can be considered as a periodic computing task. In various instances, a gateway ECU should be able to facilitate, in any given tick, such frame transmissions/receptions as well as any ad hoc software functionality without becoming overloaded. In other words, a gateway ECU should at least meet the worst-case timing and/or latency requirements of both frame transmissions/receptions and ad hoc software functionality. Unlike ad hoc software functionality, frame transmissions/receptions are periodic, and can thus be assigned time periods based on the type and/or urgency of data contained in the frame. For example, vehicle acceleration data can be considered as very urgent (e.g., used to sense a vehicle crash so as to deploy the airbags). Accordingly, a maximum latency for the transmission/reception of vehicle acceleration data can be short, and so the vehicle acceleration data can be assigned to a frame that has a short period (e.g., which means that such data is updated/refreshed very often). On the other hand, precipitation data can be considered as less urgent (e.g., used to sense rain so as to deploy the windshield wipers). Accordingly, a maximum latency for the transmission/reception of precipitation data can be long, and so the precipitation data can be assigned to a frame that has a long period (e.g., which means that such data is updated/refreshed less often). With a large number of frames to be transmitted/received and/or with different transmission/reception rates, a gateway ECU can experience a large variation in the number of frames to be handled during each tick. When more frames are to be handled in a given tick (e.g., when a larger number of frames coincide in a given tick), the gateway ECU can spend significantly more time handling such frames. When the gateway ECU is preoccupied with handling frame transmissions/receptions, it cannot timely execute ad hoc software functionality (e.g., may experience significant delays in the execution of ad hoc software functionality).

Accordingly, it can be desirable to configure gateway ECUs (and/or ECUs in general) to handle peak-load situations without becoming overloaded. Conventionally, this is facilitated by either reducing the total number of frames which the ECUs are desired to transmit or utilizing more powerful and/or more expensive ECUs. The former conventional technique sacrifices functionality and/or features, while the latter conventional technique increases manufacturing costs. Another conventional technique that is sometimes used is start-time offsets. However, start-time offsets cannot be practicably implemented with state-of-the-art software in in-vehicle computing systems. In such in-vehicle computing systems, groups of frames belonging to different vehicle functions can often be activated and/or deactivated independently from each other at any point in time, thus making it impossible to synchronize the start point of different data frames.

Various embodiments of the invention can address one or more of these technical problems by facilitating computing task coincidence reduction via prime scheduling. Specifically, the inventors of various embodiments of the invention recognized that the problem of coincidences (e.g., also called common-releases) of periodic computing tasks can be ameliorated by assigning to such periodic computing tasks time periods that are based on prime numbers. Prime numbers have the unique feature that their only multiplicative factors are 1 and themselves. When periodic computing tasks have time periods that are not based on prime numbers, their time periods often have non-trivial multiplicative factors in common, which causes the periodic computing tasks to frequently coincide with each other (e.g., which causes the periodic computing tasks to often be performed during the same tick as each other). As described herein, various embodiments of the invention can be considered as systems and/or techniques that can assign to periodic computing tasks time periods that are based on prime numbers. When the time periods are based on prime numbers as described herein, it can be the case that the time periods no longer have many non-trivial multiplicative factors in common, which can cause the periodic computing tasks to coincide with each other much less frequently. The result can be that the number of peak-load situations (e.g., where all or most of the periodic computing tasks coincide in the same tick) encountered by a computing system (e.g., a gateway ECU) is significantly reduced, thereby significantly reducing the likelihood of overload of the computing system.

As explained herein, such benefit can be achieved without reducing the total number of periodic computing tasks performed by the computing system (e.g., without sacrificing functionality/features of the computing system) and without dedicating progressively more computing resources to the computing system (e.g., without using more powerful/costly processors, without redesigning the computing system architecture). Indeed, various embodiments of the invention can achieve this benefit without topologically changing the computing system and/or the network on which the computing system is implemented; without degrading the amount and/or latencies of the periodic computing tasks performed by the computing system; without having to ensure that all periodic computing tasks have synchronized start times; without physically changing the microcontrollers and/or processors that are implemented in the computing system; and/or without regard to the type of electronic/bus communication implemented in the computing system. Instead, various embodiments of the invention can be considered as systems and/or techniques that can intelligently/cleverly assign time periods and/or cycle rates to periodic computing tasks so that ticks during which most and/or all of the periodic computing tasks coincide with each other become very rare.

More specifically, prime scheduling as described herein can decrease the probability of many periodic computing tasks coinciding in the same tick by increasing the number of ticks between occurrences of such many-task coincidences. To illustrate, suppose that the load over time of the computing system were organized into a histogram of low-load ticks (e.g., ticks during which a small percentage of the total periodic computing tasks are performed), medium-load ticks (e.g., ticks during which an intermediate percentage of the total periodic computing tasks are performed), and high-load ticks (e.g., ticks during which a large percentage of the total periodic computing tasks are performed). In such case, application of prime scheduling can cause the number of low-load ticks and medium-load ticks to increase while simultaneously causing the number of high-load ticks to significantly decrease, thereby commensurately decreasing the likelihood of the computing system becoming overloaded. In other words, prime scheduling can lead to a reduction in the number of ticks during which many, most, and/or all of the periodic computing tasks coincide with each other, in exchange for an increase in the number of ticks during which few and/or some of the periodic computing tasks coincide with each other. This can be beneficial because the computing system is not likely to become overloaded during any low-load and/or medium-load ticks, while the computing system is very likely to become overloaded during a high-load tick.

The inventors of various embodiments of the invention recognized that the frequency of high-load ticks can be strongly correlated with the hyperperiod of the periodic computing tasks, where the hyperperiod is the least common multiple of the time periods of the periodic computing tasks. As described herein, prime scheduling can significantly increase the hyperperiod of the periodic computing tasks. In various cases, this does not mean that fewer periodic computing tasks are performed in total by the computing system (e.g., features/functionality is not being sacrificed). Instead, this means that the performance of the periodic computing tasks is conducted in a smart/clever order so that there are few ticks during which most and/or all of the periodic computing tasks are performed.

To increase the hyperperiod, each periodic computing task can be assigned a time period that is based on a unique prime number. In other words, the time period of any given periodic computing task can be manipulated and/or adjusted so that the duration of the time period is equal to the product of the common tick and a prime number that corresponds to the given periodic computing task. Assigning to the periodic computing tasks time periods that are based on prime numbers can drastically increase the hyperperiod of the periodic computing tasks, which can correspondingly cause a significant reduction in the number of high-load ticks.

Various embodiments of the invention can provide systems and/or techniques that can facilitate computing task coincidence reduction via prime scheduling. In various aspects, embodiments of the invention can be considered as a computerized tool (e.g., computer-implemented software) that can be electronically integrated with a computing system. In various cases, the computing system can be configured to perform and/or facilitate a set of periodic computing tasks (e.g., one or more periodic computing tasks). Moreover, in various instances, the computing system can automatically refresh at regular intervals, where the regular interval is called a common tick. In various instances, such a computerized tool can comprise an input component, a prime component, and an execution component.

In various embodiments, the input component can electronically receive and/or access a set of latency values that respectively correspond to the set of periodic computing tasks. So, in various cases, each periodic computing task can be associated with a corresponding latency value. In various aspects, a latency value can be considered as a maximum amount of time that is permitted to elapse between executions of a particular periodic computing task. That is, a latency value can be considered as a maximum allowable time period for a particular periodic computing task. In various other aspects, however, a latency value can be a time period that is currently assigned to a particular periodic computing task. In various instances, the input component can electronically retrieve and/or access the set of latency values from any suitable centralized and/or decentralized data structure (e.g., relational data structure, graph data structure, hybrid data structure), whether remote and/or local.

In various embodiments, the prime component can iteratively assign time periods to the set of periodic computing tasks based on the set of latency values, where the time periods are based on prime numbers. Specifically, the prime component can iterate through each of the set of periodic computing tasks as follows. For a given periodic computing task, the prime component can identify a highest prime number such that the product of the prime number and the common tick does not exceed the latency value that corresponds to the given periodic computing task. Once that highest prime number is identified, the prime component can determine whether that prime number has been previously used to assign another time period to another periodic computing task in the set of periodic computing tasks. In various aspects, if the identified prime number has not yet been used for another periodic computing task, the prime component can assign to the given periodic computing task a time period, the duration of which is equal to the identified prime number multiplied by the common tick. In such case, the time period can be said to be based on the identified prime number. On the other hand, if the identified prime number has been previously used for another periodic computing task, the prime component can iteratively consider smaller prime numbers until either a prime number that has not been previously used is found or no prime numbers remain. If a prime number that has not been previously used is found, the prime component can assign to the given periodic computing task a time period that is based on that prime number (e.g., the duration of the time period can be equal to the common tick multiplied by that prime number). If no prime numbers remain (e.g., if all prime numbers that were considered have already been used before), the prime component can assign to the periodic computing task any suitable time period that is equal to or lesser than the latency value that corresponds to the given periodic computing task (e.g., if the latency value is a multiple of the common tick, the time period can be equal to the latency value; however, if the latency value is not a multiple of the common tick, the time period can have any suitable duration that is less than the latency value). In any case, the result can be that the prime component generates a set of time periods that respectively correspond to the set of periodic computing tasks. In various cases, the set of time periods can have a very large hyperperiod (e.g., a least common multiple), which means that the likelihood of many-task coincidences can be very low when the computing system operates.

Although the above discussion mentions that a search for prime numbers can include first considering a highest prime number whose product with the common tick does not exceed the latency value and next considering progressively smaller prime numbers, those having ordinary skill in the art will appreciate that this is a non-limiting and example embodiment of the invention. In various embodiments, prime numbers can be searched for and/or considered in any suitable order. For example, in some cases, rather than first considering a highest prime number whose product with the common tick does not exceed the latency value, various embodiments of the invention can include first considering a smallest prime number whose product with the common tick does not exceed the latency value. In such case, if that smallest prime number has already been used to assign another time period to another periodic computing task, progressively larger prime numbers can be considered, provided that their products with the common tick do not exceed the latency value. As another example, rather than first considering a highest prime number whose product with the common tick does not exceed the latency value, various embodiments of the invention can first consider a random prime number whose product with the common tick does not exceed the latency value. In such case, if that random prime number has already been used to assign another time period to another periodic computing task, other randomly-selected prime numbers can be considered, provided that their products with the common tick do not exceed the latency value. Thus, those having ordinary skill in the art will appreciate that, in various embodiments, prime numbers can be considered and/or searched for in any suitable order.

In various aspects, as mentioned above, the prime component can assign a time period to a periodic computing task, such that the time period is based on a unique prime number (e.g., a prime number that has not been previously used to assign a time period to a different periodic computing task). The purpose of this can be to help ensure that no two periodic computing tasks in the set of periodic computing tasks share the same time period. In various cases, this can work particularly well if the cardinality of the set of periodic computing tasks is small compared to the number of available prime numbers, and/or if the set of latency values is well distributed from shorter to longer. However, this can sometimes not be the case (e.g., there can very many tasks in the set of periodic computing tasks, the set of latency values can include very many values that are similar and/or close in magnitude, and/or there can be a scarcity of small-enough prime numbers). To deal with such situations, the prime component can take various actions.

For example, in some cases, the prime component can search for a suitable prime number for a given periodic computing task when the latency value that corresponds to the given periodic computing task is above any suitable minimum threshold value. If the latency value is below the minimum threshold value, the prime component can assign to the given periodic computing task a time period that has a duration equal to or lesser than the latency value.

In some cases, the prime component can search for a suitable prime number for a given periodic computing task when the latency value that corresponds to the given periodic computing task is below any suitable maximum threshold value. If the latency value is above the maximum threshold value, the prime component can assign to the given periodic computing task a time period that has a duration equal to or lesser than the latency value.

In some aspects, the prime component can determine whether or not the latency value that corresponds to a given periodic computing task is already based on a prime number. That is, in various instances, the prime component can search for a suitable prime number for the given periodic computing task when the quotient of the latency value and the common tick is not already prime. If the quotient between the latency value and the common tick is already prime, the prime component can assign to the given periodic computing task a time period, the duration of which is equal to or lesser than the latency value.

Furthermore, in various cases, the prime component can reuse a prime number any suitable amount of times. For instance, instead of using a prime number to assign a time period only when that prime number has not already been previously used, the prime component can, in various cases, use a prime number that has been used fewer than any suitable threshold amount of times.

In various cases, the prime component can assign time periods to all of the set of periodic computing tasks. In other cases, however, the prime component can assign time periods to any suitable subset of the set of periodic computing tasks.

In various embodiments, once the prime component assigns the set of time periods to the set of periodic computing tasks, the execution component can execute and/or otherwise cause the computing system to execute the set of periodic computing tasks according to the set of time periods. For example, the execution component can instruct the computing system to refrain from operating prior to the generation of the set of time periods, and can instruct the computing system to commence operation after the generation of the set of time periods.

Accordingly, a computerized tool as described herein can receive as input a set of latency values that correspond to a set of periodic computing tasks, and the computerized tool can assign to the set of periodic computing tasks a set of prime-based time periods that satisfy the set of latency values. As explained herein, when time periods of periodic computing tasks are based on prime numbers, the frequency and/or likelihood of many-task coincidences can become very small. Thus, the likelihood of the computing system becoming overloaded can become commensurately small.

Various embodiments of the invention can be employed to use hardware and/or software to solve problems that are highly technical in nature (e.g., to facilitate computing task coincidence reduction via prime scheduling), that are not abstract and that cannot be performed as a set of mental acts by a human. Further, some of the processes performed can be performed by a specialized computer. Specifically, such processes can include: accessing, by a device operatively coupled to a processor, a latency value associated with a periodic computing task that is performed by a computing system; assigning, by the device, a time period to the periodic computing task, wherein a duration of the time period is a product of a common tick and a prime number, such that the duration of the time period is not greater than the latency value; and periodically executing, by the device, the periodic computing task according to the time period. Such defined tasks are not typically performed manually by humans. Moreover, neither the human mind nor a human with pen and paper can electronically access a latency value, can electronically assign a prime-based time period to the periodic computing task that does not exceed the latency value, and can electronically and periodically execute the periodic computing task according to the time period. Instead, various embodiments of the invention are inherently and inextricably tied to computer technology and cannot be implemented outside of a computing environment (e.g., a periodic computing task can only exist in a computerized environment; likewise, a computerized tool that assigns a prime-based time period to the periodic computing task such that the prime-based time period is not greater than a latency value associated with the periodic computing task can also exist only in a computerized environment and cannot be implemented in any sensible way without computers).

In various instances, embodiments of the invention can integrate into a practical application the disclosed teachings regarding computing task coincidence reduction via prime scheduling. Indeed, as described herein, various embodiments of the invention, which can take the form of systems and/or computer-implemented methods, can be considered as a computerized tool that can electronically receive as input a set of latency values associated with a set of periodic computing tasks, and can electronically produce as output a set of time periods for the set of periodic computing tasks, where each of the set of time periods is based on a prime number. As mentioned above, a computing system can be configured to operate in regular ticks. When the set of periodic computing tasks have time periods that share many different multiplicative factors in common, the result can be that ticks in which many, most, and/or all of the periodic computing tasks coincide can become frequent and/or likely, which thus means that overloading of the computing system can likewise become frequent and/or likely. However, when prime-based time periods are implemented as described herein, a hyperperiod of the set of periodic computing tasks can become extremely large, which means that the set of periodic computing tasks can have time periods that do not share many different multiplicative factors in common. Thus, the result can be that ticks in which many, most, and/or all of the periodic computing tasks coincide can become infrequent and/or unlikely, which means that overloading of the computing system can likewise become infrequent and/or unlikely. Thus, prime scheduling can be implemented so as to improve the very functioning/performance of the computing system, which is a technical improvement. Moreover, prime scheduling does not require physical changes to the network architecture of the computing system, does not require sacrificing features and/or functionality of the computing system, does not require the introduction of start-time offsets, and/or does not require the implementation of more powerful and expensive processors. Instead, prime scheduling can be considered as a computer-implemented technique that smartly/cleverly modulates the durations of time periods of periodic computing tasks so that many of the periodic computing tasks do not constantly interfere/coincide with each other. Because various embodiments of the invention can improve the very performance of computing systems (e.g., can reduce the frequency and/or probability of overload), such embodiments clearly constitute a concrete and tangible technical improvement in the field of computing.

Furthermore, various embodiments of the invention can control tangible, hardware-based, and/or software-based devices based on the disclosed teachings. For example, a computing system can be real-world combination of computer hardware and/or software, such as a collection of interconnected ECUs on-board a vehicle. Such a computing system can perform and/or facilitate a set of periodic computing tasks (e.g., real-world computations and/or operations). Various embodiments of the invention can electronically receive as input a set of latency values that correspond to the set of periodic computing tasks, and can electronically assign time periods to the set of periodic computing tasks based on the set of latency values, where the time periods are the products between various prime numbers and a common tick. Accordingly, various embodiments of the invention can execute and/or can otherwise cause to the computing system to execute the set of periodic computing tasks according to the set of prime-based time periods. As mentioned above, when the set of periodic computing tasks are executed according to the set of prime-based time periods, a frequency and/or probability of many-task coincidences experienced by the computing system can be significantly reduced.

It should be appreciated that the figures and the herein disclosure describe non-limiting examples of various embodiments of the invention.

FIG. 1 illustrates a block diagram of an example, non-limiting system 100 that can facilitate computing task coincidence reduction via prime scheduling in accordance with one or more embodiments described herein. As shown, a prime number scheduling system 102 can be electronically integrated, via any suitable wired and/or wireless electronic connection, with a computing system 104. In various cases, the computing system 104 can be any suitable combination of computer hardware and/or computer software. For example, in some cases, the computing system 104 can be an in-vehicle computing system that controls and/or otherwise manages operation of a vehicle (e.g., an automobile, an aircraft, a watercraft, a spacecraft). In other cases, the computing system 104 can be any other suitable type of computing system deployed in any other suitable context.

In various instances, the computing system 104 can be configured to experience automatic software refresh events at a regular interval. In various aspects, such regular interval can be referred to as a common tick 108. In various cases, the common tick 108 can have any suitable length and/or duration (e.g., 5 ms).

In various aspects, the computing system 104 can be further configured to electronically perform, facilitate, and/or otherwise execute a set of periodic computing tasks 106. In various cases, there can be any suitable number of periodic computing tasks in the set of periodic computing tasks 106 (e.g., periodic computing task 1 to periodic computing task n, for any suitable positive integer n). In various instances, a periodic computing task can be any suitable electronic operation, process, function, computation, data transmission, and/or data reception which the computing system 104 can electronically perform, facilitate, and/or otherwise execute on a periodic basis. For example, in some cases, a periodic computing task can be the periodic transmission of data frames from communication bus to communication bus and/or from ECU to ECU.

In various embodiments, the computing system 104 can comprise one processor, microcontroller, and/or ECU that executes all of the set of periodic computing tasks 106. In various other embodiments, the computing system 104 can comprise a plurality of processors, microcontrollers, and/or ECUs that collectively execute the set of periodic computing tasks 106 (e.g., each of the plurality of processors, microcontrollers, and/or ECUs can be in charge of executing some corresponding subset of the set of periodic computing tasks 106).

Because periodic computing tasks can be performed, facilitated, and/or executed periodically, it can be the case that a time period can be assigned to each of the set of periodic computing tasks 106. In various instances, such time periods can be integer multiples of the common tick 108. For example, if the periodic computing task 1 has a time period of 20 ms, and if the common tick 108 is 5 ms, then the time period of the periodic computing task 1 can be considered as 4 ticks (e.g., 20 ms÷5 ms/tick=4 ticks). In such case, the computing system 104 can perform, facilitate, and/or execute the periodic computing task 1 once every 20 ms, which would be once every four ticks.

Because different periodic computing tasks in the set of periodic computing tasks 106 can have different time periods, the computing system 104 can perform, facilitate, and/or execute different numbers of periodic computing tasks during different ticks. In other words, the workload of the computing system 104 can vary tick by tick. For example, suppose that n=3, where the periodic computing task 1 has a time period of 2 ticks, a periodic computing task 2 has a time period of 3 ticks, and a periodic computing task 3 has a time period of 4 ticks. Accordingly, the computing system 104 can perform the periodic computing task 1 once every two ticks, the periodic computing task 2 once every three ticks, and the periodic computing task 3 once every four ticks. In such case, the computing system 104 can be required to execute all three of the tasks during every twelfth tick.

When the computing system 104 performs, facilitates, and/or executes two or more periodic computing tasks during a given tick, it can be said that the computing system 104 is experiencing a task coincidence and/or a task common-release. As mentioned above, a technical problem that can arise is that the computing system 104 can become overloaded when the computing system 104 experiences a many-task coincidence (e.g., when the computing system 104 experiences a tick during which the computing system 104 performs many periodic computing tasks).

As described herein, the prime number scheduling system 102 can, in various cases, assign prime-based time periods to the set of periodic computing tasks 106, such that many-task coincidences become rare and/or unlikely during operation of the computing system 104, thereby helping to ensure that instances during which the computing system 104 is overloaded become commensurately rare and/or unlikely. In other words, the prime number scheduling system 102 can schedule the executions of the set of periodic computing tasks 106 such that the computing system 104 is less likely to become overloaded.

As a specific non-limiting example, the computing system 104 can be an automotive computing system (e.g., ECU) that is onboard a vehicle, and the prime number scheduling system 102 can be considered as a computerized vehicle network communication design tool that is not part of and/or not onboard the vehicle. In some embodiments, the prime number scheduling system 102 can produce time period information (e.g., prime-based time periods corresponding to the set of periodic computing tasks 106) that is represented by a CAN database, a FIBEX file, an Autosar system definition, an Autosar ECU extract, and/or any other suitable type of data format. In some cases, such time period information can be electronically transmitted to the computing system 104, and the computing system 104 (e.g., which can be onboard the vehicle) can compile such time period information into computer-executable software instructions (e.g., instructions to execute the set of periodic computing tasks 106 according to the prime-based time periods generated/assigned by the prime number scheduling system 102). In other cases, the prime number scheduling system 102 can generate computer-executable software instructions (e.g., instructions to execute the set of periodic computing tasks 106 according to the prime-based time periods generated/assigned by the prime number scheduling system 102), and can electronically transmit such instructions to the computing system 104.

In various embodiments, the prime number scheduling system 102 can comprise a processor 110 (e.g., computer processing unit, microprocessor) and a computer-readable memory 112 that is operably connected to the processor 110. The memory 112 can store computer-executable instructions which, upon execution by the processor 110, can cause the processor 110 and/or other components of the prime number scheduling system 102 (e.g., input component 114, prime component 116, execution component 118) to perform one or more acts. In various embodiments, the memory 112 can store computer-executable components (e.g., input component 114, prime component 116, execution component 118), and the processor 110 can execute the computer-executable components.

In various embodiments, the prime number scheduling system 102 can comprise an input component 114. In various aspects, the input component 114 can electronically retrieve and/or access a set of latency values that respectively correspond to the set of periodic computing tasks 106. In various cases, a latency value for a given periodic computing task can be a maximum allowable/permissible time period for the given periodic computing task. In various other cases, a latency value for a given periodic computing task can be a time period that is currently assigned to the periodic computing task. In various instances, the input component 114 can electronically retrieve and/or access the set of latency values from any suitable data structure (e.g., graph, relational, hybrid), whether centralized and/or decentralized, and/or whether remote and/or local.

In various embodiments, the prime number scheduling system 102 can comprise a prime component 116. In various aspects, the prime component 116 can leverage the set of latency values to iteratively assign to each of the set of periodic computing tasks 106 a prime-based time period. Specifically, for each periodic computing task in the set of periodic computing tasks 106, the prime component 116 can identify a largest prime number, such that the product of that largest prime number and the common tick 108 is equal to or less than the latency value that corresponds to the periodic computing task under consideration. If that largest prime number has not already been used to assign a time period to some other task in the set of periodic computing tasks 106, the prime component 116 can assign to the periodic computing task under consideration a time period, the duration of which is equal to the product of that prime number and the common tick 108. However, if that largest prime number has already been used to assign a time period to some other task in the set of periodic computing tasks 106, the prime component 116 can iteratively consider smaller prime numbers until a prime number that has not been used to assign a time period to some other task is found. If such a prime number is found, the prime component 116 can assign to the periodic computing task under consideration a time period, the duration of which is equal to the product of the found prime number and the common tick 108. On the other hand, if no such prime number is found, the prime component 116 can assign to the periodic computing task under consideration a time period, the duration of which is equal to or less than the latency value that corresponds to the periodic computing task under consideration. The result can be that the prime component 116 generates a set of time periods that respectively correspond to the set of periodic computing tasks 106. In various aspects, operations of the prime component 116 can ensure that a least common multiple of the set of time periods is very large, meaning that the frequency and/or likelihood of many-task coincidences can be very small. Accordingly, if the computing system 104 performs, facilitates, and/or executes the set of periodic computing tasks 106 according to the set of time periods generated/assigned by the prime component 116, the frequency and/or likelihood of the computing system 104 experiencing an overload can be greatly reduced.

In various embodiments, the prime number scheduling system 102 can comprise an execution component 118. In various aspects, the execution component 118 can execute and/or can otherwise cause the computing system 104 to execute the set of periodic computing tasks 106 in accordance with the set of time periods generated/assigned by the prime component 116. For example, the execution component 118 can transmit an electronic instruction to the computing system 104 which informs the computing system 104 of the set of time periods and/or which commands the computing system 104 to implement the set of time periods.

Figure 2:
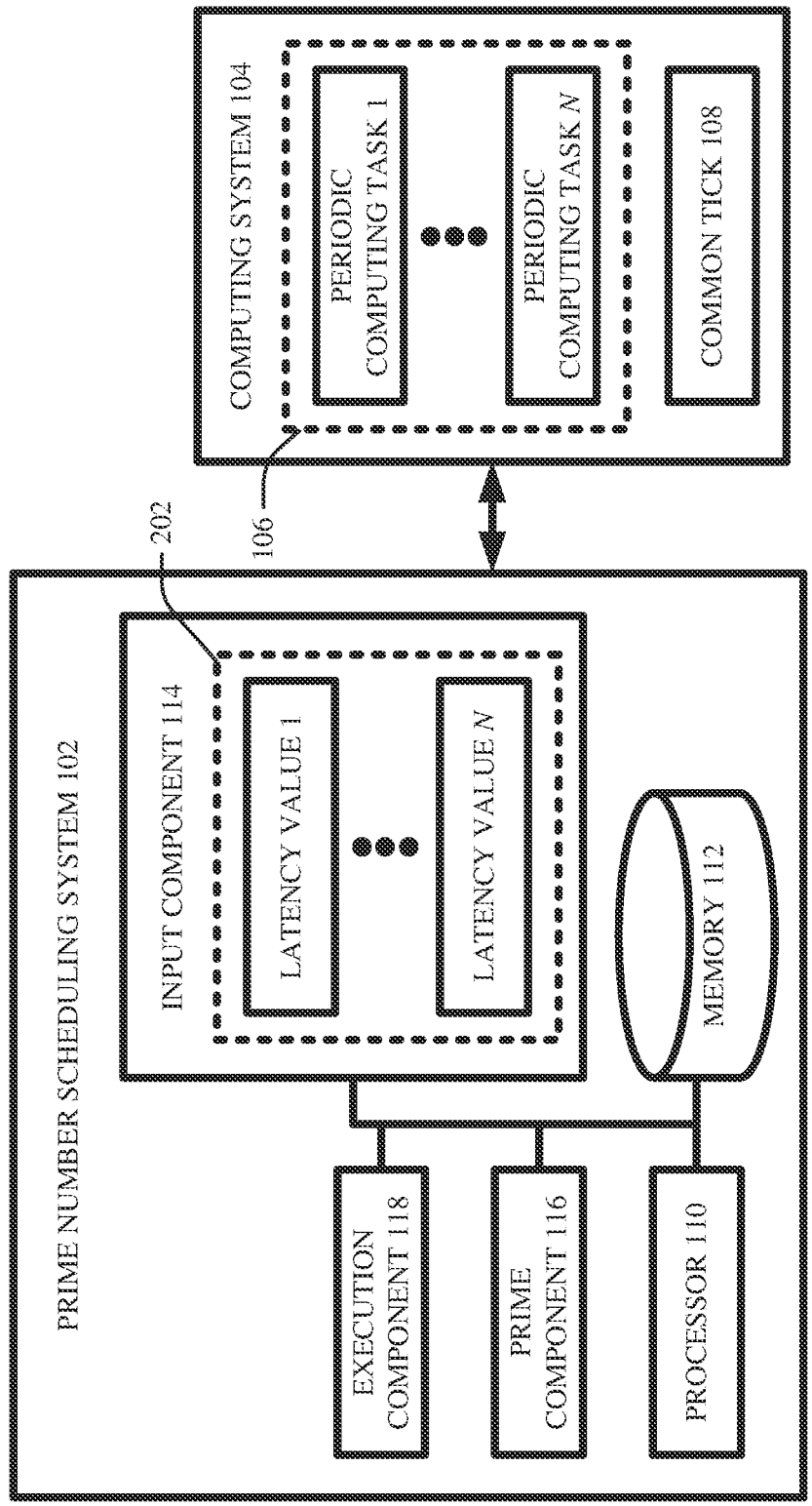
FIG. 2 illustrates a block diagram of an example, non-limiting system including a set of latency values that facilitates computing task coincidence reduction via prime scheduling in accordance with one or more embodiments described herein.

FIG. 2 illustrates a block diagram of an example, non-limiting system 200 including a set of latency values that can facilitate computing task coincidence reduction via prime scheduling in accordance with one or more embodiments described herein. As shown, the system 200 can, in some cases, comprise the same components as the system 100, and can further comprise a set of latency values 202.

In various embodiments, as mentioned above, the input component 114 can electronically retrieve and/or access, from any suitable data structure (not shown in the figures), the set of latency values 202. In various cases, the set of latency values 202 can respectively correspond to the set of periodic computing tasks 106. That is, a latency value 1 can correspond to and/or be associated with the periodic computing task 1, and a latency value n can correspond to and/or be associated with the periodic computing task n. As mentioned above, a latency value can, in various cases, be considered as a maximum allowable time period that is permitted to be assigned to a periodic computing task (e.g., the latency value 1 represents the longest allowable period that can be assigned to the periodic computing task 1; the latency value n represents the longest allowable period that can be assigned to the periodic computing task n). In other cases, however, a latency value can instead represent a currently-assigned time period rather than a maximum allowable time period (e.g., the latency value 1 can be a time period that is currently assigned to the periodic computing task 1; the latency value n can be a time period that is currently assigned to the periodic computing task n).

Figure 3:
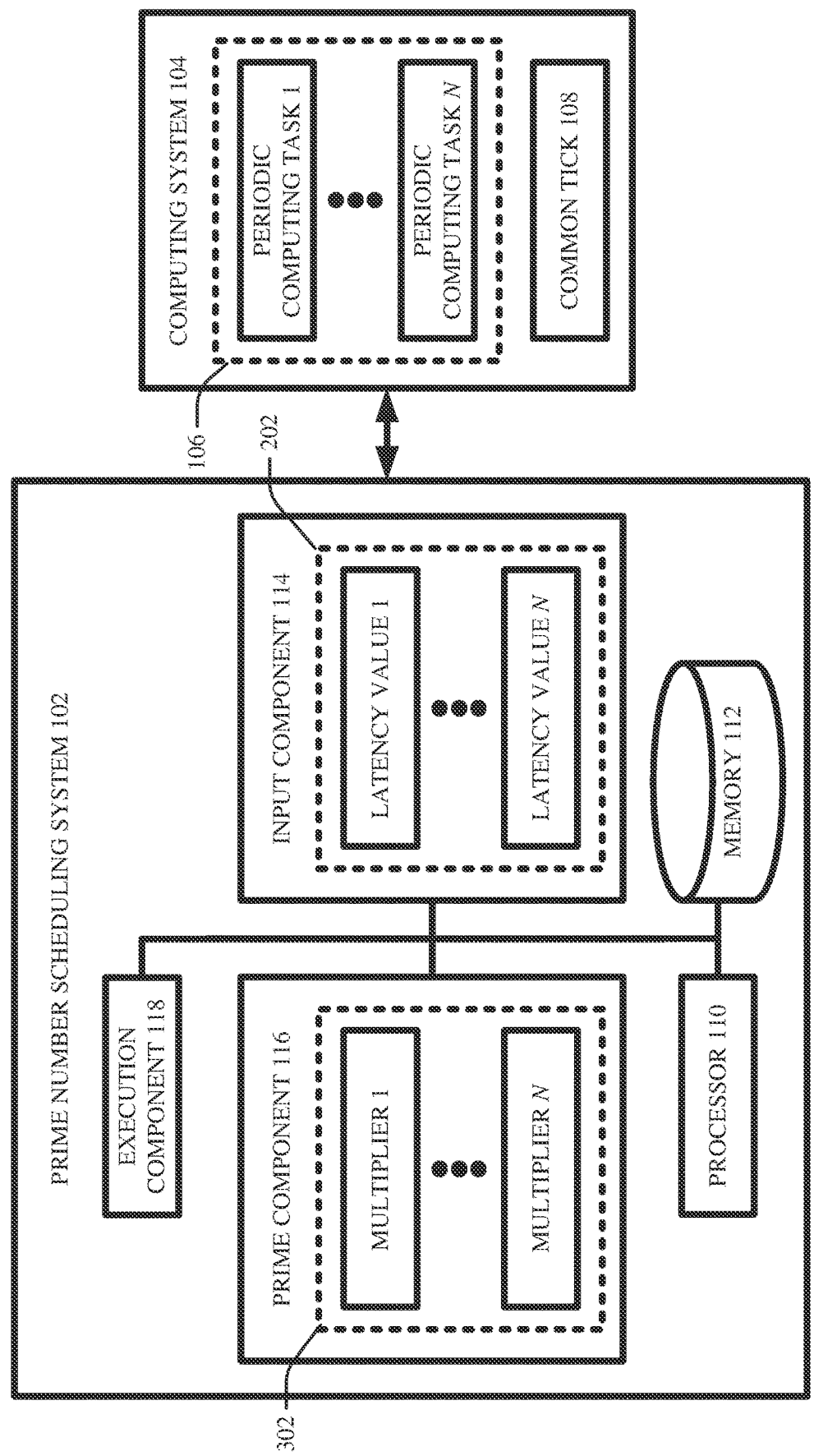
FIG. 3 illustrates a block diagram of an example, non-limiting system including a set of multipliers that facilitates computing task coincidence reduction via prime scheduling in accordance with one or more embodiments described herein.

FIG. 3 illustrates a block diagram of an example, non-limiting system 300 including a set of multipliers that can facilitate computing task coincidence reduction via prime scheduling in accordance with one or more embodiments described herein. As shown, the system 300 can, in some cases, comprise the same components as the system 200, and can further comprise a set of multipliers 302.

In various aspects, the set of multipliers 302 can respectively correspond to the set of periodic computing tasks 106 and/or to the set of latency values 202 (e.g., a multiplier 1 can correspond to and/or be associated with the periodic computing task 1 and/or the latency value 1; a multiplier n can correspond to and/or be associated with the periodic computing task n and/or the latency value n).

In various instances, the prime component 116 can generate the set of multipliers 302 based on the set of latency values 202. In various cases, this can be iteratively performed as follows. The prime component 116 can begin by considering the periodic computing task 1. In various cases, the prime component 116 can identify a highest prime number such that a product between that highest prime number and the common tick 108 does not exceed the latency value 1. In various aspects, the prime component 116 can determine whether that highest prime number has been previously used to assign some other time period to another task in the set of periodic computing tasks 106. If that highest prime number has not been previously used to assign a time period to another task in the set of periodic computing tasks 106, the prime component 116 can set the multiplier 1 to be equal to that highest prime number. On the other hand, if that highest prime number has already been used to assign a time period to another task in the set of periodic computing tasks 106, the prime component 116 can iteratively consider smaller prime numbers until a prime number that has not been previously used is found or until no prime numbers remain. If a prime number that has not been previously used is found, the prime component 116 can set the multiplier 1 to be equal to that found prime number. However, if no suitable prime number is found, the prime component 116 can set the multiplier 1 to be equal to the rounded-down quotient of the latency value 1 and the common tick 108 (e.g., the multiplier 1 can be equal to the latency value 1 divided by the common tick 108, rounded down to the nearest integer). In any case, the prime component 116 can thus have established a value for the multiplier 1. In various aspects, the prime component 116 can repeat the above actions for the periodic computing task 2 and can continue in such fashion until all n multipliers are established.

In the above example, the prime component 116 begins with the periodic computing task 1, proceeds to the periodic computing task 2, and so on. Those having ordinary skill in the art will appreciate that this is non-limiting, and that, in various cases, time periods can be assigned to the set of periodic computing tasks 106 in any suitable order.

Figure 4:
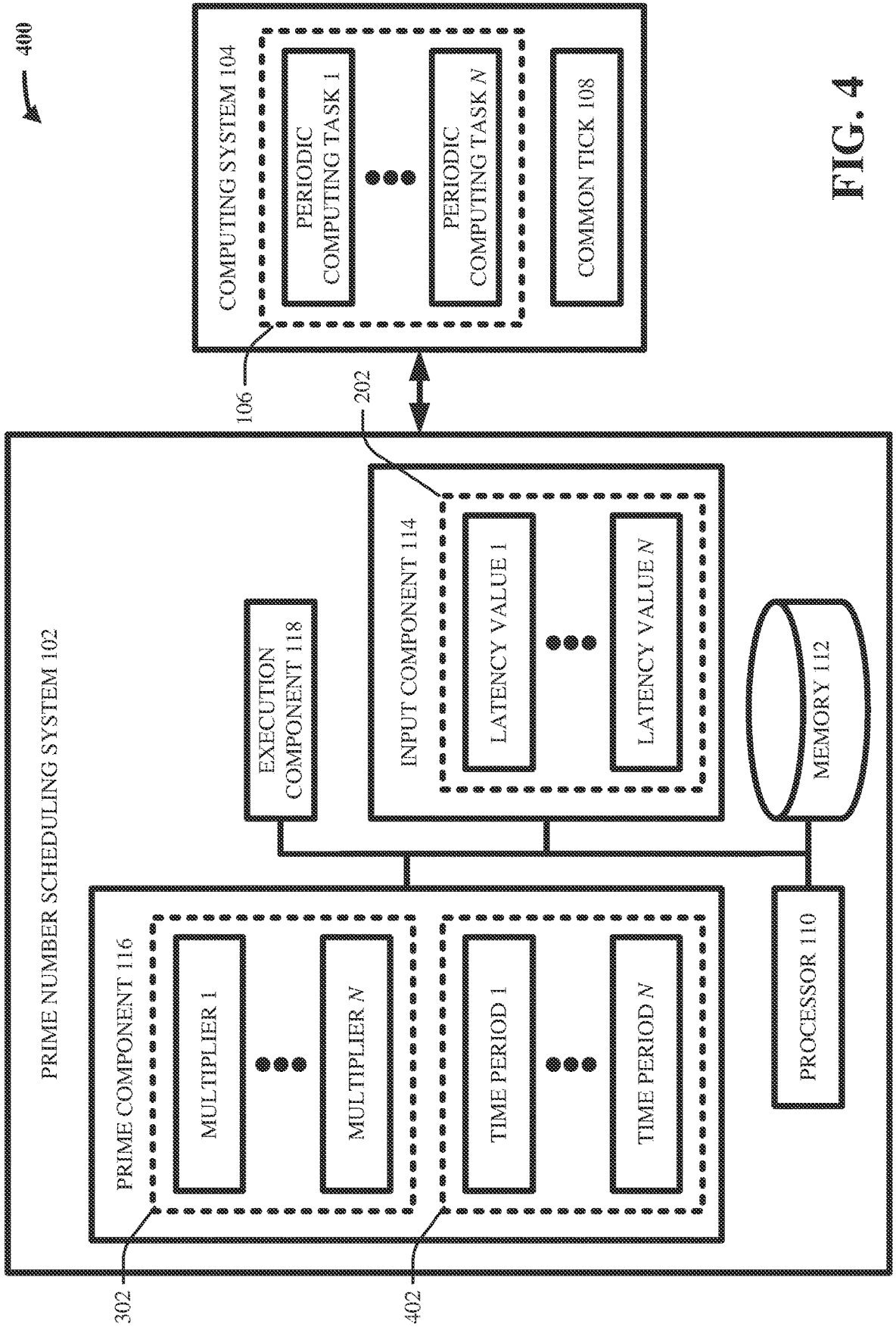
FIG. 4 illustrates a block diagram of an example, non-limiting system including a set of time periods that facilitates computing task coincidence reduction via prime scheduling in accordance with one or more embodiments described herein.

FIG. 4 illustrates a block diagram of an example, non-limiting system 400 including a set of time periods that can facilitate computing task coincidence reduction via prime scheduling in accordance with one or more embodiments described herein. As shown, the system 400 can, in some cases, comprise the same components as the system 300, and can further comprise a set of time periods 402.

In various aspects, the set of time periods 402 can respectively correspond to the set of periodic computing tasks 106, to the set of latency values 202, and/or to the set of multipliers 302 (e.g., a time period 1 can correspond to and/or be associated with the periodic computing task 1, the latency value 1, and/or the multiplier 1; a time period n can correspond to and/or be associated with the periodic computing task n, the latency value n, and/or the multiplier n).

In various aspects, the prime component 116 can generate the set of time periods 402 based on the set of multipliers 302. More specifically, in various instances, the prime component 116 can generate the set of time periods 402 by multiplying each of the set of multipliers 302 with the common tick 108. That is, the prime component 116 can obtain the time period 1 by multiplying the multiplier 1 and the common tick 108, and the prime component 116 can obtain the timer period n by multiplying the multiplier n and the common tick 108.

In various aspects, the prime component 116 can be considered as assigning the set of time periods 402 to the set of periodic computing tasks 106. In other words, the prime component 116 can generate the time period 1 for the periodic computing task 1, thereby assigning the timer period 1 to the periodic computing task 1. Similarly, the prime component 116 can generate the time period n for the periodic computing task n, thereby assigning the time period n to the periodic computing task n.

Note that, in various aspects, the set of time periods 402 can be considered as being prime-based, due to the above-described technique by which the prime component 116 establishes the set of multipliers 302. In various aspects, the set of time periods 402 can be considered as prime-based, notwithstanding that it might be the case that not all of the set of multipliers 302 are prime numbers (e.g., sometimes no suitable prime number is available, in which case the multiplier can be equal to the rounded-down quotient of the latency value and the common tick).

In various instances, above-described actions of the prime component 116 can ensure that the set of time periods 402 have a very large hyperperiod (e.g., least common multiple). In various cases, structuring the set of time periods 402 to have a very large hyperperiod can cause the computing system 104 to experience many-task coincidences very rarely when the computing system 104 executes the set of periodic computing tasks 106. This means that a probability of the computing system 104 becoming overloaded due to the set of periodic computing tasks 106 is commensurately small.

Note that, when no suitable prime number is found for a particular periodic computing task, the multiplier of that particular periodic computing task can be equal to the rounded-down quotient of the latency value of that particular periodic computing task and the common tick 108. Thus, when such a multiplier is multiplied by the common tick 108 to yield a time period for the particular periodic computing task, the duration of the time period is equal to or lesser than the latency value. Those having ordinary skill in the art will appreciate that, in various cases, when no suitable prime number can be found for a particular periodic computing task, equivalent results can be obtained as follows: the prime component 116 can refrain from establishing a multiplier for that particular periodic computing task, and can instead directly and/or immediately assign to the particular periodic computing task a time period that has a duration equal to or less than the latency value.

As mentioned above, in various aspects, the execution component 118 can execute and/or otherwise cause the computing system 104 to execute the set of periodic computing tasks 106 according to the set of time periods 402 (e.g., such that the periodic computing task 1 is performed every so often as specified by the time period 1; such that the periodic computing task n is performed every so often as specified by the time period n).

FIGS. 5-9 illustrate flow diagrams that help to clarify various of the above details.

Figure 5:
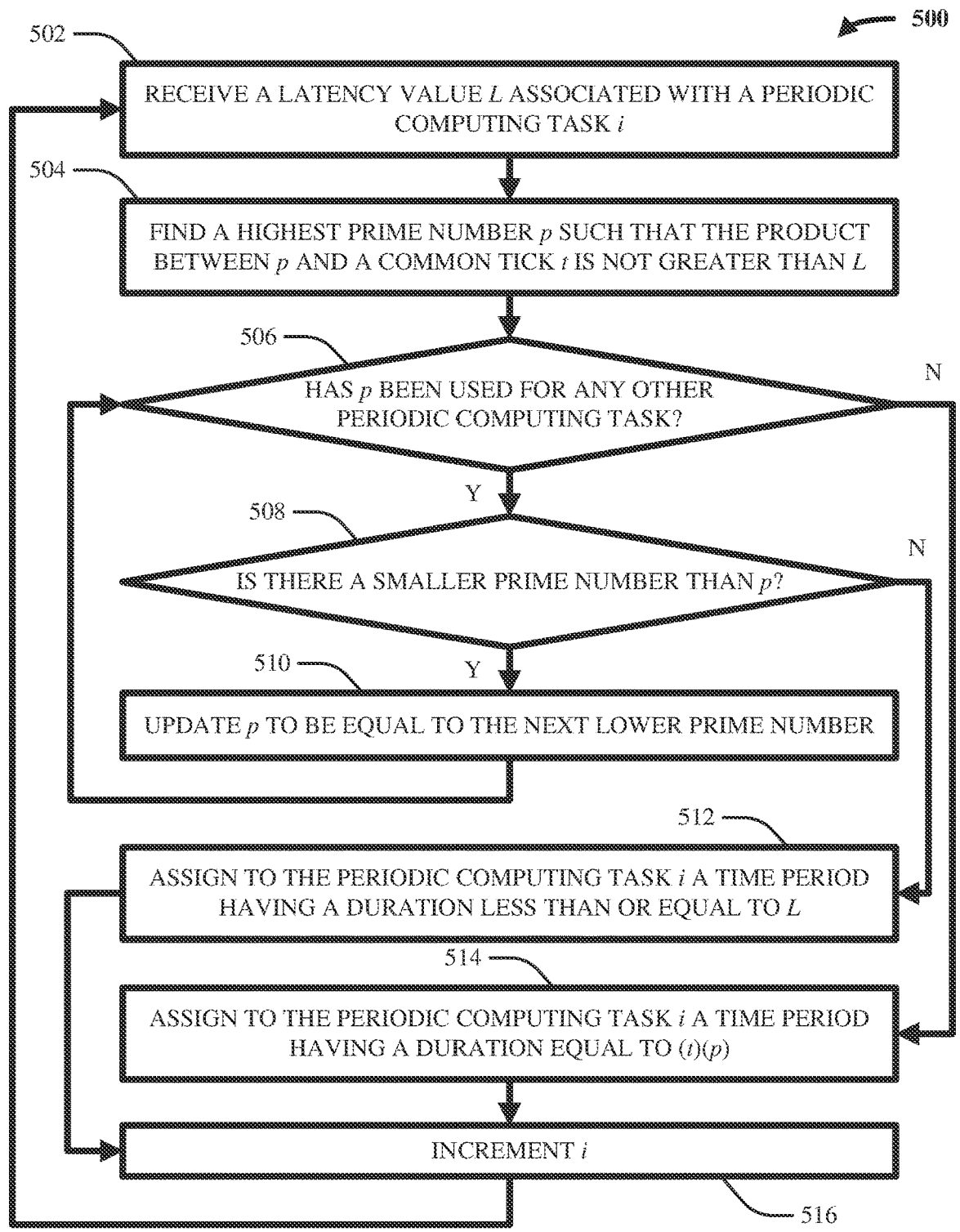
FIG. 5 illustrates a flow diagram of an example, non-limiting computer-implemented method that facilitates computing task coincidence reduction via prime scheduling in accordance with one or more embodiments described herein.

FIG. 5 illustrates a flow diagram of an example, non-limiting computer-implemented method 500 that can facilitate computing task coincidence reduction via prime scheduling in accordance with one or more embodiments described herein. In various aspects, the computer-implemented method 500 can be facilitated by the prime number scheduling system 102. More specifically, the computer-implemented method 500 illustrates an example work-flow which the prime number scheduling system 102 can follow in order to generate the set of time periods 402, such that the set of time periods 402 have a very large hyperperiod.

In various embodiments, act 502 can include receiving, by a device (e.g., 114) operatively coupled to a processor, a latency value L (e.g., one of the set of latency values 202) that is associated with a periodic computing task i (e.g., one of the set of periodic computing tasks 106).

In various aspects, act 504 can include finding, by the device (e.g., 116), a highest prime number p such that the product between p and a common tick t (e.g., the common tick 108) is not greater than L (e.g., such that (t)(p)≤L).

In various instances, act 506 can include determining, by the device (e.g., 116), whether p has been used for any other periodic computing task (e.g., determining whether p has already been established as a multiplier for some other periodic computing task). For the very first periodic computing task under consideration (e.g., if i=1), the answer to this determination can be "no." If p has not been used for any other periodic computing task, the computer-implemented method 500 can proceed to act 514. On the other hand, if p has already been used for some other periodic computing task, the computer-implemented method 500 can proceed to act 508.

In various cases, act 508 can include determining, by the device (e.g., 116), whether there exists a prime number that is smaller than p. If so, the computer-implemented method 500 can proceed to act 510. If not, the computer-implemented method 500 can proceed to act 512.

In various embodiments, act 510 can include updating, by the device (e.g., 116), the value of p to be equal to the next lower prime number. In other words, the value of p can be changed so that it is equal to the highest prime number that is smaller than the old value of p. In various cases, the computer-implemented method 500 can proceed back to act 506.

In various aspects, act 512 can include assigning, by the device (e.g., 116), to the periodic computing task i a time period (e.g., one of the set of time periods 402) having a duration that is less than or equal to L. In some cases, act 512 can be considered as establishing for the periodic computing task i a multiplier (e.g., one of the set of multipliers 302) that is equal to L/t rounded down to the nearest integer, and can be considered as forming a time period for the periodic computing task i by multiplying that multiplier with t. In various cases, the computer-implemented method 500 can proceed to act 516.

In various aspects, act 514 can include assigning, by the device (e.g., 116), to the periodic computing task i a time period (e.g., one of the set of time periods 402) having a duration that is equal to (t)(p). Equivalently, act 514 can be considered as establishing for the periodic computing task i a multiplier (e.g., one of the set of multipliers 302) that is equal to p, and can be considered as forming a time period for the periodic computing task i by multiplying that multiplier with t. In various cases, the computer-implemented method 500 can proceed to act 516.

In various instances, act 516 can include incrementing, by the device (e.g., 116) i. That is, once a time period has been assigned to the periodic computing task i, a next periodic computing task can be considered. The computer-implemented method 500 can then proceed back to act 502.

In various cases, the computer-implemented method 500 can be considered as illustrating how to create prime-based time periods when sufficiently many prime numbers are available. In various aspects, a sufficient amount of prime numbers can be available when there are few periodic computing tasks to consider (e.g., when n is small) or when latency values are evenly distributed from short to long. However, this might not always be the case; that is, it is possible for there to be many periodic computing tasks to consider (e.g., n can be large) and/or it is possible for many of the latency values to be close and/or the same in magnitude. In such cases, there might not be enough suitable prime numbers with which to create new time periods. Accordingly, as shown in FIGS. 6-9, some potential variations of the computer-implemented method 500 can be provided to help deal with such situations.

Figure 6:
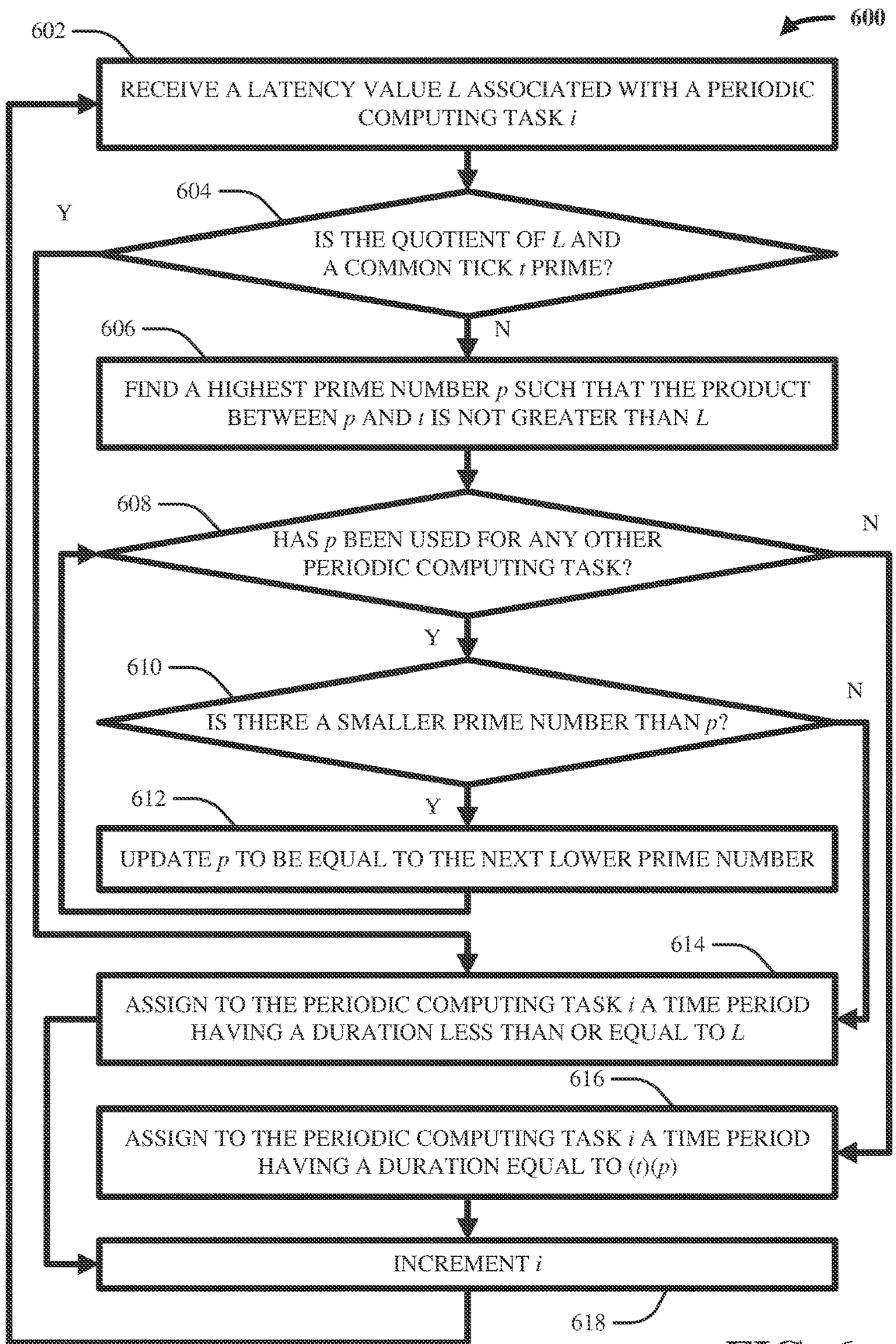
FIG. 6 illustrates a flow diagram of an example, non-limiting computer-implemented method including determining whether a latency value is already based on a prime number that facilitates computing task coincidence reduction via prime scheduling in accordance with one or more embodiments described herein.

FIG. 6 illustrates a flow diagram of an example, non-limiting computer-implemented method 600 including determining whether a latency value is already based on a prime number that can facilitate computing task coincidence reduction via prime scheduling in accordance with one or more embodiments described herein. In various aspects, the computer-implemented method 600 can be facilitated by the prime number scheduling system 102. More specifically, the computer-implemented method 600 illustrates an example work-flow which the prime number scheduling system 102 can follow in order to generate the set of time periods 402, in which a search for a suitable prime number for a given periodic computing task is not performed when the latency value of that periodic computing task is already prime-based.

In various embodiments, act 602 can include receiving, by a device (e.g., 114) operatively coupled to a processor, a latency value L that is associated with a periodic computing task i.

In various aspects, act 604 can include determining, by the device (e.g., 116), whether the quotient of L and a common tick t is prime. In other words, it can be determined whether L is already based on a prime number. If the quotient of L and t is prime (e.g., if L is already based on a prime number), the computer-implemented method 600 can proceed to act 614. On the other hand, if the quotient of L and t is not prime (e.g., if L is not already based on a prime number), the computer-implemented method 600 can proceed to act 606. In various cases, the purpose of act 604 can be to weed out latency values that are already prime-based (e.g., if the latency value of a given periodic computing task is already prime-based, there can be no need to search for a smaller prime number with which to generate a new prime-based time period for the given periodic computing task).

In various instances, act 606 can include finding, by the device (e.g., 116), a highest prime number p such that the product between p and t is not greater than L (e.g., such that $(t)(p) \leq L$).

In various instances, act 608 can include determining, by the device (e.g., 116), whether p has been used for any other periodic computing task. If p has not been used for any other periodic computing task, the computer-implemented method 600 can proceed to act 616. On the other hand, if p has already been used for some other periodic computing task, the computer-implemented method 600 can proceed to act 610.

In various cases, act 610 can include determining, by the device (e.g., 116), whether there exists a prime number that is smaller than p. If so, the computer-implemented method 600 can proceed to act 612. If not, the computer-implemented method 600 can proceed to act 614.

In various embodiments, act 612 can include updating, by the device (e.g., 116), the value of p to be equal to the next lower prime number. In various cases, the computer-implemented method 600 can proceed back to act 608.

In various aspects, act 614 can include assigning, by the device (e.g., 116), to the periodic computing task i a time period having a duration that is less than or equal to L. In various cases, act 614 can be considered as establishing for the periodic computing task i a multiplier that is equal to L/t rounded down to the nearest integer, and can be considered as forming a time period for the periodic computing task i by multiplying that multiplier with t. In various cases, the computer-implemented method 600 can proceed to act 618.

In various aspects, act 616 can include assigning, by the device (e.g., 116), to the periodic computing task i a time period having a duration that is equal to (t) (p). Equivalently, act 616 can be considered as establishing for the periodic computing task i a multiplier that is equal to p, and can be considered as forming a time period for the periodic computing task i by multiplying that multiplier with t. In various cases, the computer-implemented method 600 can proceed to act 618.

In various instances, act 618 can include incrementing, by the device (e.g., 116) i. That is, once a time period has been assigned to the periodic computing task i, a next periodic computing task can be considered. The computer-implemented method 600 can then proceed back to act 602.

Figure 7:
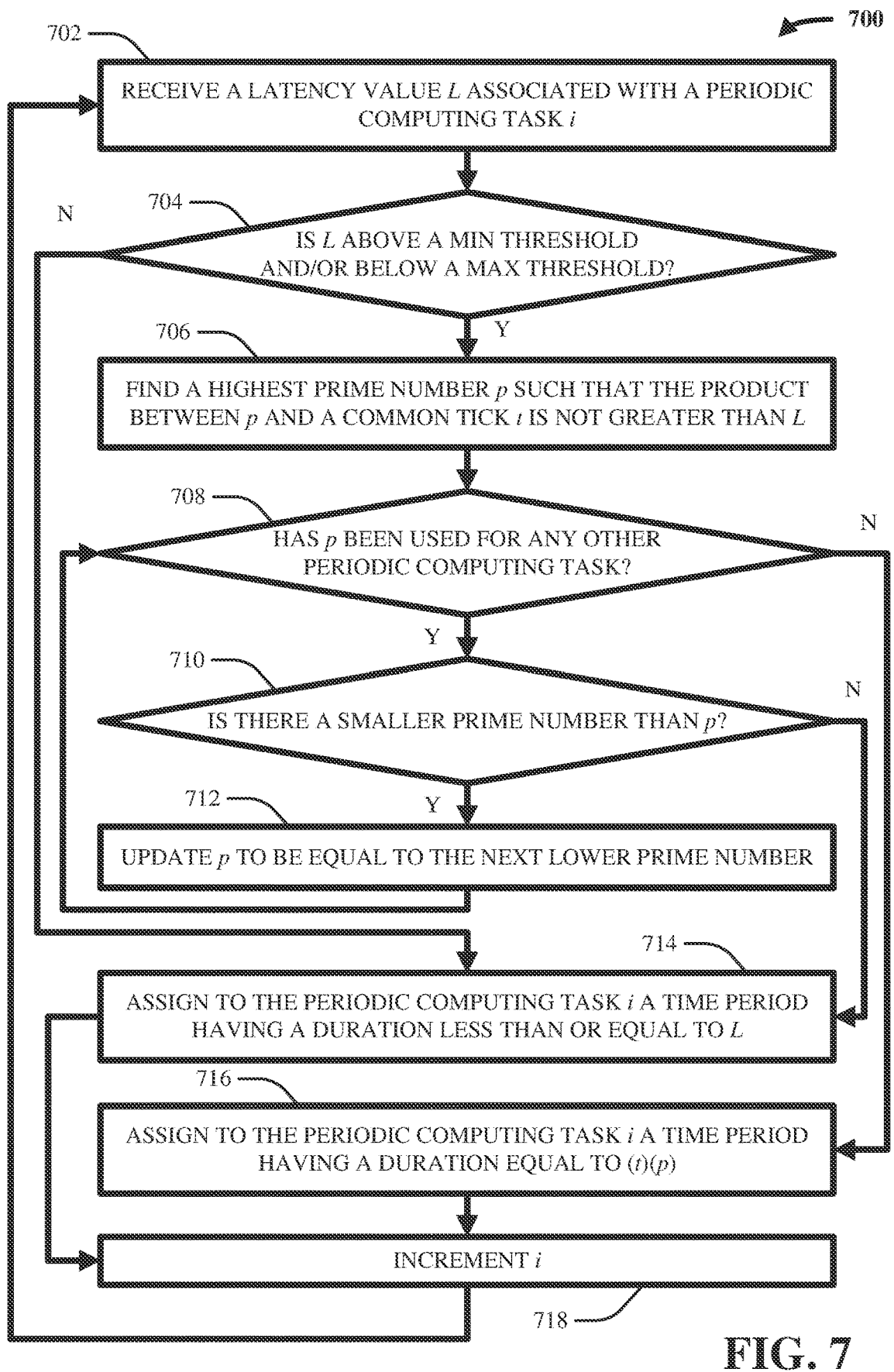
FIG. 7 illustrates a flow diagram of an example, non-limiting computer-implemented method including determining whether a latency value is above or below appropriate thresholds that facilitates computing task coincidence reduction via prime scheduling in accordance with one or more embodiments described herein.

FIG. 7 illustrates a flow diagram of an example, non-limiting computer-implemented method 700 including determining whether a latency value is above or below appropriate thresholds that can facilitate computing task coincidence reduction via prime scheduling in accordance with one or more embodiments described herein. In various aspects, the computer-implemented method 700 can be facilitated by the prime number scheduling system 102. More specifically, the computer-implemented method 700 illustrates an example work-flow which the prime number scheduling system 102 can follow in order to generate the set of time periods 402, in which a period boundary/threshold is defined.

In various embodiments, act 702 can include receiving, by a device (e.g., 114) operatively coupled to a processor, a latency value L that is associated with a periodic computing task i.

In various aspects, act 704 can include determining, by the device (e.g., 116), whether L is above a minimum threshold and/or whether L is below a maximum threshold. Such thresholds can have any suitable values. In various cases, if L is above the minimum threshold and/or below the maximum threshold, the computer-implemented method 700 can proceed to act 706. On the other hand, if L is not above the minimum threshold and/or if L is not below the maximum threshold, the computer-implemented method 700 can proceed to act 714. In various cases, the purpose of act 704 can be to weed out latency values that are too small and/or too big (e.g., when dealing with latency values that are small in comparison to the longest latency values, there might be a lack of available prime numbers with which to create new time periods; accordingly latency values that are considered to be too small can be kept without change, even if they are not already prime; similarly reasoning can apply to latency values that are very large). Those having ordinary skill in the art will appreciate that act 704 is illustrated as a non-limiting example. In various cases, a minimum threshold can be used and a maximum threshold can be omitted. In various other cases, a maximum threshold can be used and a minimum threshold can be omitted.

In various instances, act 706 can include finding, by the device (e.g., 116), a highest prime number p such that the product between p and a common tick t is not greater than L (e.g., such that $(t)(p) \leq L$).

In various instances, act 708 can include determining, by the device (e.g., 116), whether p has been used for any other periodic computing task. If p has not been used for any other periodic computing task, the computer-implemented method 700 can proceed to act 716. On the other hand, if p has already been used for some other periodic computing task, the computer-implemented method 700 can proceed to act 710.

In various cases, act 710 can include determining, by the device (e.g., 116), whether there exists a prime number that is smaller than p. If so, the computer-implemented method 700 can proceed to act 712. If not, the computer-implemented method 700 can proceed to act 714.

In various embodiments, act 712 can include updating, by the device (e.g., 116), the value of p to be equal to the next lower prime number. In various cases, the computer-implemented method 700 can proceed back to act 708.

In various aspects, act 714 can include assigning, by the device (e.g., 116), to the periodic computing task i a time period having a duration that is less than or equal to L. In various cases, act 714 can be considered as establishing for the periodic computing task i a multiplier that is equal to L/t rounded down to the nearest integer, and can be considered as forming a time period for the periodic computing task i by multiplying that multiplier with t. In various cases, the computer-implemented method 700 can proceed to act 718.

In various aspects, act 716 can include assigning, by the device (e.g., 116), to the periodic computing task i a time period having a duration that is equal to $(t)(p)$. Equivalently, act 716 can be considered as establishing for the periodic computing task i a multiplier that is equal to p, and can be considered as forming a time period for the periodic computing task i by multiplying that multiplier with t. In various cases, the computer-implemented method 700 can proceed to act 718.

In various instances, act 718 can include incrementing, by the device (e.g., 116) i. That is, once a time period has been assigned to the periodic computing task i, a next periodic computing task can be considered. The computer-implemented method 700 can then proceed back to act 702.

Figure 8:
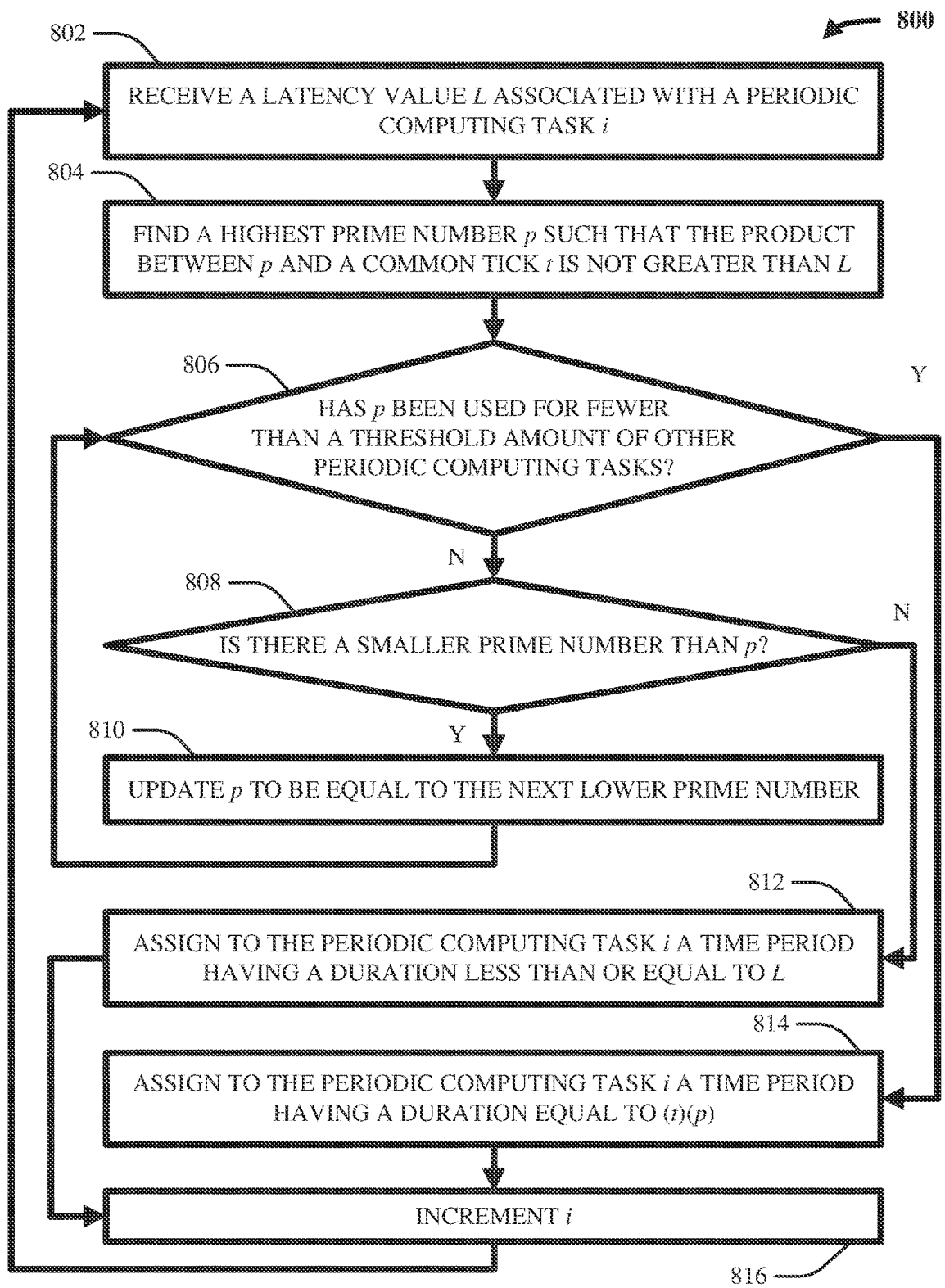
FIG. 8 illustrates a flow diagram of an example, non-limiting computer-implemented method including determining whether a prime number has been used fewer than a threshold number of times that facilitates computing task coincidence reduction via prime scheduling in accordance with one or more embodiments described herein.

FIG. 8 illustrates a flow diagram of an example, non-limiting computer-implemented method 800 including determining whether a prime number has been used fewer than a threshold number of times that can facilitate computing task coincidence reduction via prime scheduling in accordance with one or more embodiments described herein. In various aspects, the computer-implemented method 800 can be facilitated by the prime number scheduling system 102. More specifically, the computer-implemented method 800 illustrates an example work-flow which the prime number scheduling system 102 can follow in order to generate the set of time periods 402, in which prime numbers can be reused a configurable maximum number of times.

In various embodiments, act 802 can include receiving, by a device (e.g., 114) operatively coupled to a processor, a latency value L that is associated with a periodic computing task i.

In various aspects, act 804 can include finding, by the device (e.g., 116), a highest prime number p such that the product between p and a common tick t is not greater than L (e.g., such that $(t)(p) \leq L$).

In various instances, act 806 can include determining, by the device (e.g., 116), whether p has been used for fewer than a threshold amount of other periodic computing tasks (e.g., determining whether p has already been established as a multiplier for other periodic computing tasks). If p has been used for fewer than the threshold amount of other periodic computing tasks, the computer-implemented method 800 can proceed to act 814. On the other hand, if p has not been used for fewer than the threshold amount of other periodic computing tasks, the computer-implemented method 800 can proceed to act 808. In various cases, while FIGS. 5-7 illustrate work-flows in which a prime number can be used no more than once (e.g., cannot have been used for any other periodic computing task), the purpose of act 806 can be to allow prime numbers to be reused for any suitable number of instances (e.g., can have been used for a certain number of other periodic computing tasks). So, for example, if the threshold amount is 3, then a prime number can be used to create time periods for a maximum of three periodic computing tasks. In various cases, the threshold amount can have any suitable value.

In various cases, act 808 can include determining, by the device (e.g., 116), whether there exists a prime number that is smaller than p. If so, the computer-implemented method 800 can proceed to act 810. If not, the computer-implemented method 800 can proceed to act 812.

In various embodiments, act 810 can include updating, by the device (e.g., 116), the value of p to be equal to the next lower prime number. In various cases, the computer-implemented method 800 can proceed back to act 806.

In various aspects, act 812 can include assigning, by the device (e.g., 116), to the periodic computing task i a time period having a duration that is less than or equal to L. In various cases, act 812 can be considered as establishing for the periodic computing task i a multiplier that is equal to L/t rounded down to the nearest integer, and can be considered as forming a time period for the periodic computing task i by multiplying that multiplier with t. In various cases, the computer-implemented method 800 can proceed to act 816.

In various aspects, act 814 can include assigning, by the device (e.g., 116), to the periodic computing task i a time period having a duration that is equal to $(t)(p)$. Equivalently, act 814 can be considered as establishing for the periodic computing task i a multiplier that is equal to p, and can be considered as forming a time period for the periodic computing task i by multiplying that multiplier with t. In various cases, the computer-implemented method 800 can proceed to act 816.

In various instances, act 816 can include incrementing, by the device (e.g., 116) i. That is, once a time period has been assigned to the periodic computing task i, a next periodic computing task can be considered. The computer-implemented method 800 can then proceed back to act 802.

In various cases, those having ordinary skill in the art will appreciate that FIGS. 5-8 are non-limiting examples and that any suitable combinations of FIGS. 5-8 can be implemented in various embodiments.

In various aspects, any of FIGS. 5-8 can be implemented when the set of periodic computing tasks 106 include cyclic and/or periodic transmissions/receptions of data frames between ECUs of an in-vehicle system. In such cases, the data frames can already exist, and the time periods can be assigned to the data frames as described above. In other cases, however, the data frames might not yet exist (e.g., raw data packets generated by one or more ECUs might not have been assigned to any data frames yet). In such cases, the computer-implemented method 900 of FIG. 9 can be implemented.

Figure 9:
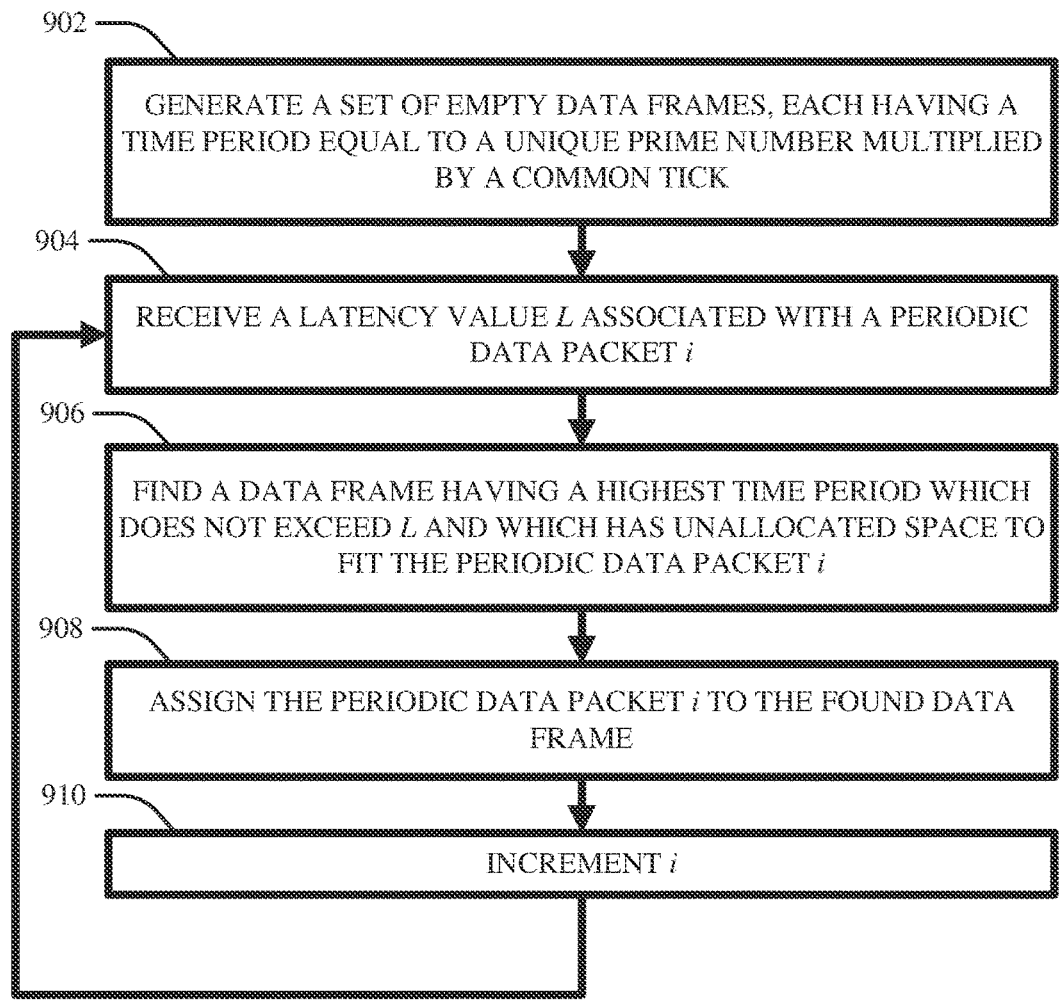
FIG. 9 illustrates a flow diagram of an example, non-limiting computer-implemented method that facilitates computing task coincidence reduction via prime scheduling in accordance with one or more embodiments described herein.

FIG. 9 illustrates a flow diagram of an example, non-limiting computer-implemented method 900 that can facilitate computing task coincidence reduction via prime scheduling in accordance with one or more embodiments described herein. In various instances, the computer-implemented method 900 can be facilitated by the prime number scheduling system 102.

In various embodiments, act 902 can include generating, by a device (e.g., 116) operatively coupled to a processor, a set of empty data frames, each having a time period equal to a unique prime number multiplied by a common tick. In some embodiments, prime numbers can be reused any suitable number of times, such that two or more frames might have a same time period.

In various aspects, act 904 can include receiving, by the device (e.g., 114), a latency value L associated with a periodic data packet i (e.g., one of the set of periodic computing tasks 106).

In various instances, act 906 can include finding, by the device (e.g., 116), a data frame that has a highest time period which does not exceed L and which has unallocated space to fit the periodic data packet i.

In various cases, act 908 can include assigning, by the device (e.g., 116), the periodic data packet i to the found data frame.

In various instances, act 910 can include incrementing, by the device (e.g., 116), i. The computer-implemented method 900 can then proceed back to act 902.

The computer-implemented method 900 can be applied in a situation where data packets are desired to be cyclically transmitted but in which the data packets have not yet been assigned to any periodically-transmitted data frames. In such case, the prime component 116 can generate a set of empty data frames, and can assign to each data frame a unique time period, where the unique time period is equal to a unique prime number multiplied by the common tick 108. Then, the prime component 116 can allocate different data packets to the empty data frames, based on the latency values of the data packets. The result can be that the data packets are assigned to data frames that have prime-based time periods.

As explained above, FIGS. 5-9 illustrate various non-limiting and example computer-implemented methods that involve searching for and/or considering prime numbers in order from highest to lowest (e.g., first identifying a highest prime number whose product with the common tick does not exceed a given latency value, and then, if that highest prime number has already been used to assign a time period to another periodic computing task, considering progressively smaller prime numbers). Those having ordinary skill in the art will appreciate that this search order is a non-limiting example. In various embodiments, any other suitable search order can be implemented. For example, in some cases, various embodiments of the invention can include first considering a smallest prime number whose product with the common tick does not exceed the given latency value. If that smallest prime number has already been used to assign another time period to another periodic computing task, progressively larger prime numbers can be considered, provided that their products with the common tick do not exceed the latency value. As another example, various embodiments of the invention can first consider a random prime number whose product with the common tick does not exceed the latency value. If that random prime number has already been used to assign another time period to another periodic computing task, other randomly-selected prime numbers can be considered, provided that their products with the common tick do not exceed the latency value. Thus, those having ordinary skill in the art will appreciate that, in various embodiments, prime numbers can be considered and/or searched for in any suitable order.

In various cases, FIGS. 10-16 depict example, non-limiting statistics that demonstrate benefits of various embodiments of the invention.

FIGS. 10-11 illustrate example, non-limiting tables of results that demonstrate various benefits of computing task coincidence reduction via prime scheduling in accordance with one or more embodiments described herein.

As shown, FIG. 10 pertains to an example, non-limiting situation in which the common tick 108 is equal to 5 ms and in which the set of periodic computing tasks 106 include seven tasks: task A to task G. Table 1002 depicts currently-assigned time periods (e.g., as explained above, they could instead be maximum allowable time periods) that correspond to the seven tasks. As shown, task A has a currently-assigned time period of 10 ms, task B has a currently-assigned time period of 25 ms, task C has a currently-assigned time period of 70 ms, task D has a currently-assigned time period of 100 ms, task E has a currently-assigned time period of 180 ms, task F has a currently-assigned time period of 250 ms, and task G has a currently-assigned time period of 1000 ms. As shown in table 1002, an integer multiplier for each of the tasks can be computed by dividing the time period of the given task by the common tick (e.g., the integer multiplier for task A is 2 which is equal to 10 ms divided by 5 ms; the integer multiplier for task G is 200 which is equal to 1000 ms divided by 5 ms). As shown, it can be computed that the hyperperiod of the seven tasks with the currently-assigned time periods is about 63 seconds (e.g., the least common multiple of 10 ms, 25 ms, 70 ms, 100 ms, 180 ms, 250 ms, and 1000 ms is 63,000 ms). In other words, all seven tasks coincide once every 63 seconds. With a common tick of 5 ms, there are 12,600 ticks in a hyperperiod of 63 seconds.

Table 1004 depicts prime-based time periods that correspond to the seven tasks, which prime-based time periods can be generated/assigned via application of various embodiments of the invention. In this example, prime scheduling has been applied to the seven tasks in order from A to G (e.g., though any order can be implemented in various cases). As shown, the time periods of task A and task B can remain unchanged, since their time periods are already prime-based (e.g., for task A, the quotient of 10 ms and the 5 ms tick is 2, which is already prime; for task B, the quotient of 25 ms and the 5 ms tick is 5, which is already prime). Since the time periods for tasks C to G are not already prime-based, they can be altered by various embodiments of the invention. Specifically, for task C, the highest prime number which, when multiplied by the common tick, does not exceed 70 ms is 13 (e.g., 13 multiplied by 5 ms equals 65 ms which is not greater than 70 ms). Accordingly, task C can be assigned a prime-based time period of 65 ms. Equivalently, task C can be assigned a multiplier of 13, and the time period for task C can be obtained by multiplying that multiplier with the 5 ms tick. For task D, the highest prime number which, when multiplied by the common tick, does not exceed 100 ms is 19 (e.g., 19 multiplied by 5 ms equals 95 ms which is not greater than 100 ms). Accordingly, task D can be assigned a prime-based time period of 95 ms. Prime-based time periods can be assigned to tasks E to G in the this way, with the results shown in table 1004. As can be seen, the hyperperiod of the new prime-based time periods is now about 3,580,796 seconds, which is about 41 days. With a common tick of 5 ms, there are 716,159,210 ticks in a hyperperiod of 41 days.

Therefore, by applying prime scheduling as described herein, the hyperperiod of the seven tasks can be increased from 63 seconds to 41 days. In other words, prime scheduling can reduce the frequency/occurrence of all seven of the tasks coinciding with each other from once every 63 seconds to once every 41 days (e.g., if the computing system 104 operated for 41 days continuously). This is a notable improvement to the performance of the computing system 104.

Further benefits are illustrated in FIG. 11. As shown, table 1102 of FIG. 11 depicts more granular statistics regarding how prime scheduling can reduce task coincidences. Specifically, the left-most column of table 1102 lists types/categories of coincidences for this non-limiting example: 0-task coincidences (e.g., ticks during which none of the seven tasks is performed), 1-task coincidences (e.g., ticks during which only one of the seven tasks is performed), 2-task coincidences (e.g., ticks during which only two of the seven tasks are performed), 3-task coincidences (e.g., ticks during which only three of the seven tasks are performed), 4-task coincidences (e.g., ticks during which only four of the seven tasks are performed), 5-task coincidences (e.g., ticks during which only five of the seven tasks are performed), 6-task coincidences (e.g., ticks during which only six of the seven tasks are performed), and 7-task coincidences (e.g., ticks during which all seven of the seven tasks are performed).

As shown, table 1102 lists the number of ticks that fall within each of these coincidence types/categories, both prior to prime scheduling and after prime scheduling, along with percent difference calculations. These statistics are based on assuming that the computing system 104 is operated for 716,159,210 continuous ticks (e.g., operated for one prime-based hyperperiod).

As can be seen in table 1102, prime scheduling causes a significant reduction in the frequency of ticks that involve many-task coincidences (e.g., over 99% reduction in the number of 7-task coincidences, 6-task coincidences, and 5-task coincidences; over 90% reduction in the number of 4-task coincidences; over 50% reduction in the number of 3-task coincidences). As also shown, prime scheduling causes a slight increase in the frequency of ticks that involve few-task coincidences (e.g., over 50% increase in the number of 2-task coincidences, over 10% increase in the number of 1-task coincidences). As explained above, the computing system can more easily handle few-task coincidences rather than many-task coincidences (e.g., it is more likely for the computing system to become overloaded when dealing with many-task coincidences than with few-task coincidences). Thus, because the frequency of many-task coincidences is significantly reduced, the likelihood of the computing system 104 becoming overloaded is likewise significantly reduced, notwithstanding the slight increase in the frequency of few-task collisions. In other words, prime scheduling can help to prevent overloading by converting most of the many-task coincidences into few-task coincidences.

Table 1102 provides frequency data of task coincidences, but not data regarding distribution of task coincidences. Table 1104, on the other hand, provide such distribution data. Specifically, table 1104 provides statistics that characterize the distribution of task coincidences throughout a hyperperiod. As shown, for each type/category of task coincidence, a minimum tick interval between such task coincidences and a maximum tick interval between such task coincidences are computed, both before prime scheduling and after prime scheduling.

For instance, before prime scheduling, the minimum interval (e.g., worst case) separating two ticks that both include 5-task coincidences is 20 ticks, and the maximum interval (e.g., best case) separating two ticks that both include 5-task coincidences is 200 ticks. After prime scheduling, on the other hand, the minimum interval (e.g., worst case) separating two ticks that both include 5-task coincidences is 130 ticks, and the maximum interval (e.g., best case) separating two ticks that both include 5-task coincidences is 76,570 ticks. As shown in table 1104, prime scheduling has increased the minimum interval for such 5-task coincidences by 550%. In other words, prime scheduling has ensured that 5-task coincidences are more spaced apart over the course of a hyperperiod than they otherwise would have been. This is certainly beneficial because it helps to reduce the likelihood of overload.

Such worst-case percent differences are also calculated for the other types of coincidences. As shown, prime scheduling caused the minimum intervals to drastically increase for many-task coincidences (e.g., 7-task coincidences by 5,683,703.25%, 6-task coincidences by 38,185%, and 5-task coincidences by 550%), at the modest expense of decreasing the minimum intervals for some few-task coincidences (e.g., 4-task coincidences by 80%, 3-task coincidences by 50%, and 2-task coincidences by 50%). Again, because the computing system can more easily handle few-task coincidences rather than many-task coincidences, these results demonstrate improved performance on the part of the computing system.

FIGS. 12-13 illustrate example, non-limiting tables of results that demonstrate benefits of computing task coincidence reduction via prime scheduling in accordance with one or more embodiments described herein. In various aspects, FIGS. 12-13 can be considered as analogous to FIGS. 10-11 for another non-limiting example situation.

As shown, in the non-limiting example situation of FIG. 12 there can be six tasks (e.g., A to F) with the currently-assigned time periods depicted in table 1202 (e.g., again, these can be maximum allowable time periods in various instances). In various cases, the hyperperiod of those currently-assigned time periods is 46.2 seconds. As shown, table 1204 lists the new prime-based time periods that are generated via prime scheduling. In various cases, the new hyperperiod can be 4288.4 seconds, which is about 71.5 minutes. Again, this verifies that prime scheduling can drastically increase hyperperiods of periodic computing tasks.

As shown in FIG. 13, table 1302 provides statistics that demonstrate the reduction in task coincidence frequency that is facilitated by prime scheduling. As shown, prime scheduling can cause significant reduction in many-task coincidences (e.g., reduction of over 90% for 6-task coincidences and 5-task coincidences; reduction of over 80% for 4-task coincidences; reduction of over 50% for 3-task coincidences), at the modest expense of an increase in some few-task coincidences (e.g., increase of 307.383% for 2-task coincidences). As mentioned above, the computing system 104 can better handle few-task coincidences than many-task coincidences, and so these results again demonstrate that prime scheduling helps to avoid overloading of the computing system 104.

As shown, table 1304 provides statistics regarding the minimum intervals and maximum intervals separating various tick coincidences over a hyperperiod. Again, as can be seen, prime scheduling can cause a significant increase in the minimum tick interval for many-task coincidences (e.g., meaning that such many-task coincidences become more spaced apart and thus easier to handle).

FIGS. 14-16 illustrate example, non-limiting tables of results that demonstrate benefits of computing task coincidence reduction via prime scheduling in accordance with one or more embodiments described herein. FIGS. 14-16 can be considered as analogous to FIGS. 10 and 12, but can pertain to a much larger example situation. As shown, FIGS. 14-16 can pertain to a non-limiting example situation that includes 43 different periodic computing tasks.

Table 1402 lists various currently-assigned time periods of those periodic computing tasks, and indicates that the current hyperperiod is 19,855,836 seconds, which is about 229 days. Although this is a rather large hyperperiod, much improvement can be gained by applying prime scheduling, as explained below.

Table 1502 lists the new prime-based time periods of those 43 periodic computing tasks after prime scheduling is implemented. In the example shown, prime numbers are allowed to be used a maximum of two times (e.g., described with respect to FIG. 8), and a minimum latency threshold of 55 ms is implemented (e.g., only currently-assigned time periods that exceed 55 ms are changed, as described with FIG. 7). As shown, prime scheduling can cause the hyperperiod to become many tens of orders of magnitude larger. Again, this is a concrete benefit of various embodiments of the invention since it helps to reduce the frequency and/or probability of overloading of the computing system 104.

Table 1602 shows the granular reductions and percent differences for each type/category of task coincidence. Note that the table 1602 shows partial results. Specifically, the table 1602 shows calculations for 14667942768 ticks where the full hyperperiod after implementation of prime scheduling is 146679427683544526982689192018865703420 ticks. Computing the frequencies of all task coincidences for such a large hyperperiod is intractable with currently available computer processing power. This is why certain many-task coincidence frequencies in the second column of the table 1602 are shown as zero; those many-task coincidences did not occur during the analyzed portion of the hyperperiod.

Even though the table 1602 shows calculations for only a portion of a full hyperperiod, it still illustrates benefits of various embodiments of the invention. Again, as can be seen, prime scheduling can cause significant reductions in the frequencies of many-task coincidences (e.g., nearly 100% reductions are achieved for 28-task coincidences and higher, and over 90% reductions are achieved for 20-task coincidences and higher), at the modest expense of increased frequencies of some few-task coincidences (e.g., notable increases in 2-task coincidences, 6-task coincidences, 7-task coincidences, and 11-task coincidences). Again, because the computing system 104 is able to better handle few-task coincidences than many-task coincidences, these results demonstrate that performance of the computing system 104 is improved via prime scheduling.

Figure 17:
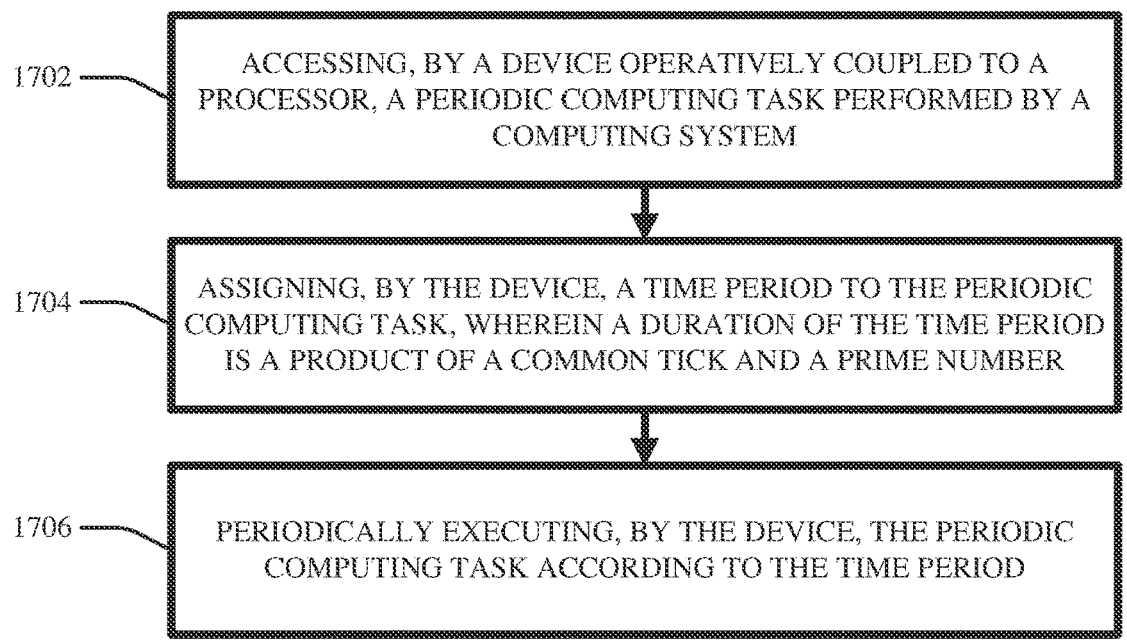
FIG. 17 illustrates a flow diagram of an example, non-limiting computer-implemented method that facilitates computing task coincidence reduction via prime scheduling in accordance with one or more embodiments described herein.

FIG. 17 illustrates a flow diagram of an example, non-limiting computer-implemented method 1700 that can facilitate computing task coincidence reduction via prime scheduling in accordance with one or more embodiments described herein.

In various embodiments, act 1702 can include accessing, by a device (e.g., 114) operatively coupled to a processor, a periodic computing task (e.g., one of 106) performed by a computing system (e.g., 104).

In various aspects, act 1704 can include assigning, by the device (e.g., 116), a time period (e.g., one of 402) to the periodic computing task, wherein a duration of the time period is a product of a common tick (e.g., 108) and a prime number (e.g., one of 302).

In various instances, act 1706 can include periodically executing, by the device (e.g., 118) the periodic computing task according to the time period.

Although not explicitly shown in FIG. 17, in various aspects, the computer-implemented method 1700 can further comprise: accessing, by the device (e.g., 114), a latency value (e.g., one of 202) associated with the periodic computing task, wherein the duration of the time period is not greater than the latency value.

Although not explicitly shown in FIG. 17, in various aspects, the prime number can be a highest prime number, such that a product between the common tick and a next larger prime number exceeds the latency value.

Although not explicitly shown in FIG. 17, in various instances, the computer-implemented method 1700 can further include: determining, by the device (e.g., 116), that the latency value is above a threshold, wherein the assigning the time period is based on the determining (e.g., such as in FIG. 7).

Although not explicitly shown in FIG. 17, in various instances, the computer-implemented method 1700 can further include: determining, by the device (e.g., 116), that the latency value is not already based on a prime number, wherein the assigning the time period is based on the determining (e.g., such as in FIG. 6).

Although not explicitly shown in FIG. 17, in various instances, the computer-implemented method 1700 can further include: determining, by the device (e.g., 116), that the prime number has not been used to assign another time period to another periodic computing task performed by the computing system, wherein the assigning the time period is based on the determining (e.g., such as in FIG. 5).

Although not explicitly shown in FIG. 17, in various instances, the computer-implemented method 1700 can further include: determining, by the device (e.g., 116), that the prime number has been used to assign an amount of other time periods to other periodic computing tasks performed by the computing system, wherein the amount is less than a threshold, and wherein the assigning the time period is based on the determining (e.g., such as in FIG. 8).

In some embodiments, during deployment, the computing system 104 can experience a change in operating mode and/or a change in operating state, such that the set of latency values 202 and/or such that the set of periodic computing tasks 106 are changed and/or altered (e.g., periodic computing tasks can be added to and/or subtracted from the set of periodic computing tasks 106 upon a change in mode/state; values in the set of latency values 202 can be increased and/or decreased upon a change in mode/state). In such cases, the prime number scheduling system 102 can re-assign, as described herein, prime-based time periods based on the changed/altered set of latency values and/or based on the changed/altered set of periodic computing tasks.

Various embodiments of the invention provide for systems and/or techniques that can facilitate prime scheduling. As described herein, this can involve assigning prime-based time periods to periodic computing tasks. In various instances, prime-based time periods can have a very long hyperperiod (e.g., a very large least common multiple), which helps to ensure that the occurrence of many-task coincidences becomes rare and/or unlikely. Because a computing system can easily become overloaded when experiencing a many-task coincidence, and because the computing system is much more resistant to overloading when handling few-task coincidences, prime-scheduling can thus help to prevent and/or ameliorate overloading of the computing system. In other words, prime-scheduling can improve the very performance of the computing system, which is a concrete technical improvement.

Moreover, as described herein, prime-scheduling can be facilitated without implementing physical changes to the computing system (e.g., without purchasing more powerful processors, without redesigning any network architectures) and without sacrificing features and/or functionality of the computing system (e.g., without reducing the total number of periodic computing tasks performed by the computing system, without degrading/relaxing latency values and/or timing requirements of the periodic computing tasks). Thus, prime-scheduling can be considered as a technique by which to cleverly assign time periods to the periodic computing tasks so that instances in which many of the periodic computing tasks coincide with each other become very rare. Again, this is a concrete and tangible technique improvement.

Figure 18:
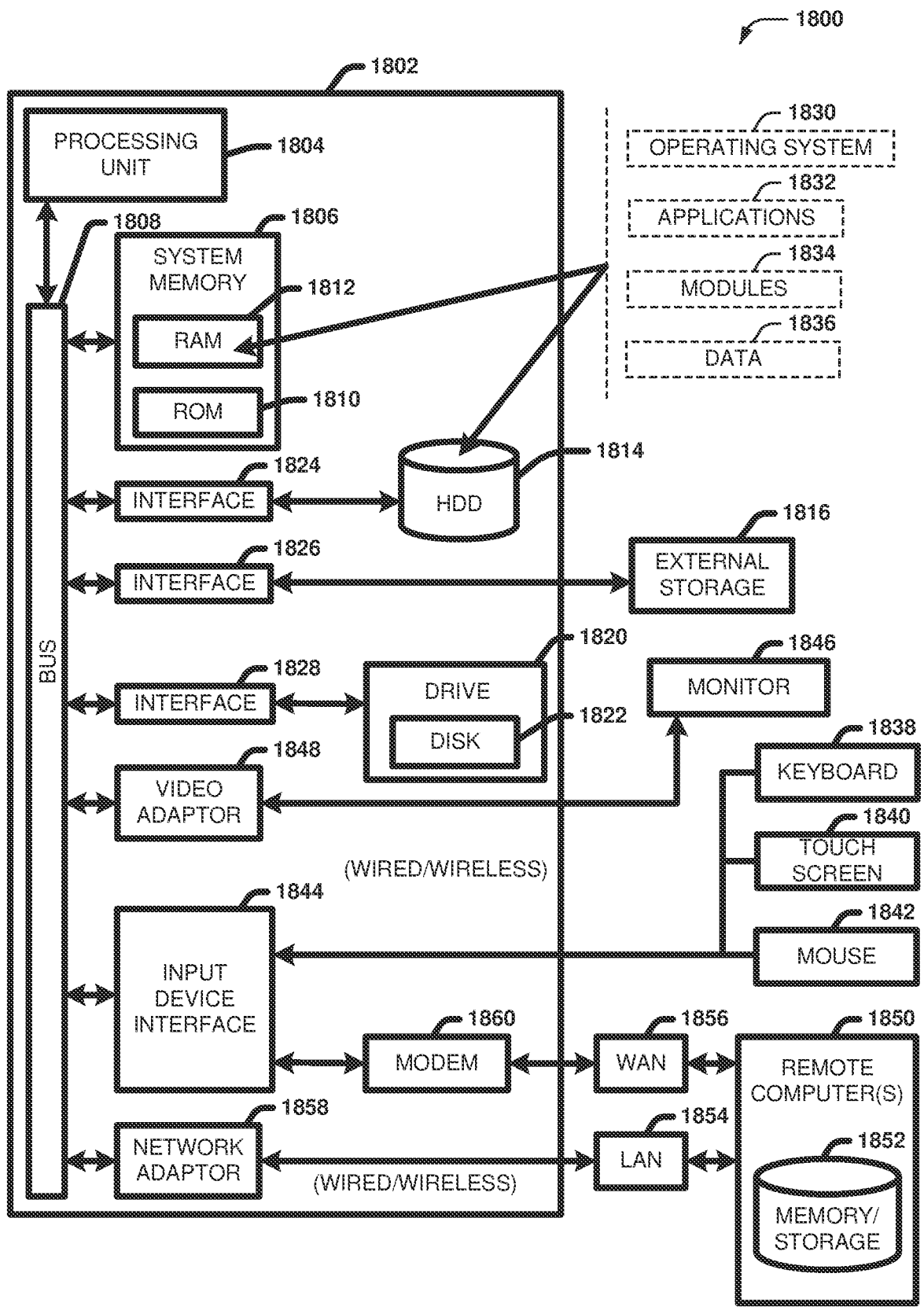
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 19:
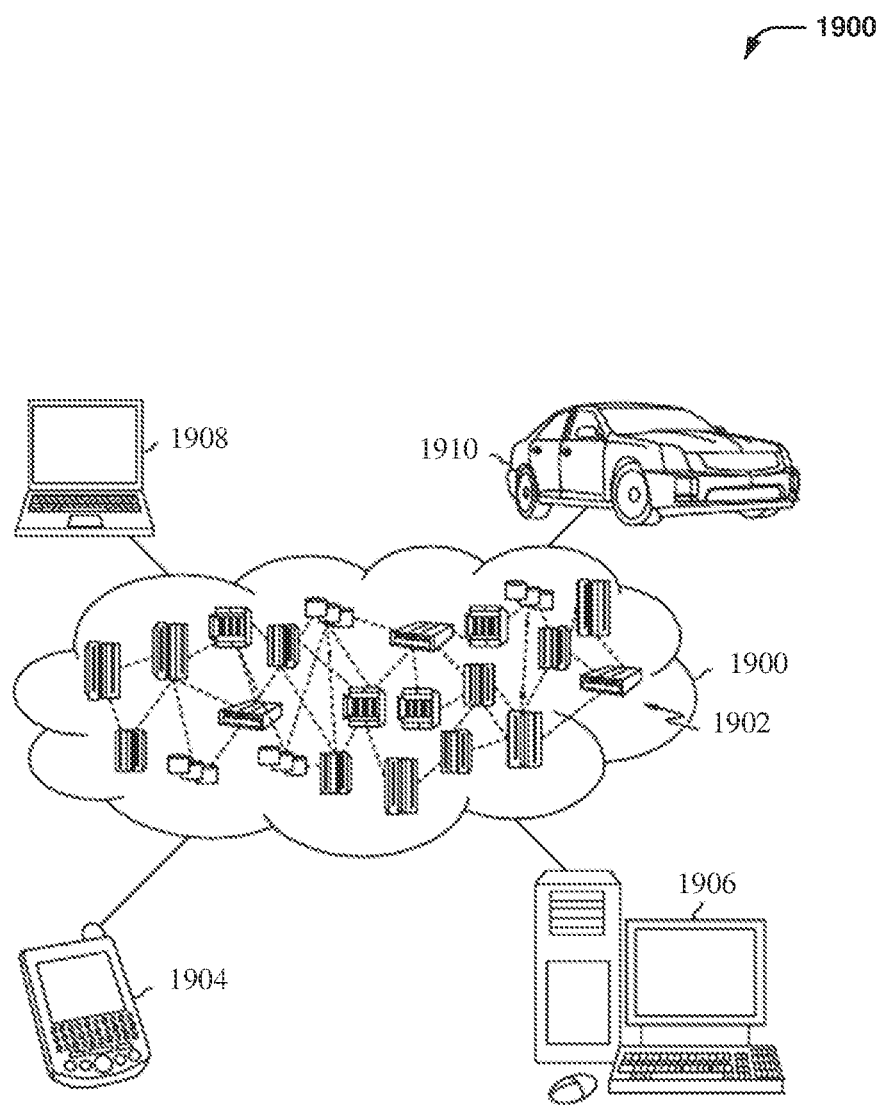
FIG. 19 illustrates an example, non-limiting cloud computing environment in accordance with one or more embodiments described herein.

Referring now to FIG. 19, illustrative cloud computing environment 1900 is depicted. As shown, cloud computing environment 1900 includes one or more cloud computing nodes 1902 with which local computing devices used by cloud consumers, such as, for example, personal digital assistant (PDA) or cellular telephone 1904, desktop computer 1906, laptop computer 1908, and/or automobile computer system 1910 may communicate. Nodes 1902 may communicate with one another. They may be grouped (not shown) physically or virtually, in one or more networks, such as Private, Community, Public, or Hybrid clouds as described hereinabove, or a combination thereof. This allows cloud computing environment 1900 to offer infrastructure, platforms and/or software as services for which a cloud consumer does not need to maintain resources on a local computing device. It is understood that the types of computing devices 1904-1910 shown in FIG. 19 are intended to be illustrative only and that computing nodes 1902 and cloud computing environment 1900 can communicate with any type of computerized device over any type of network and/or network addressable connection (e.g., using a web browser).

Figure 20:
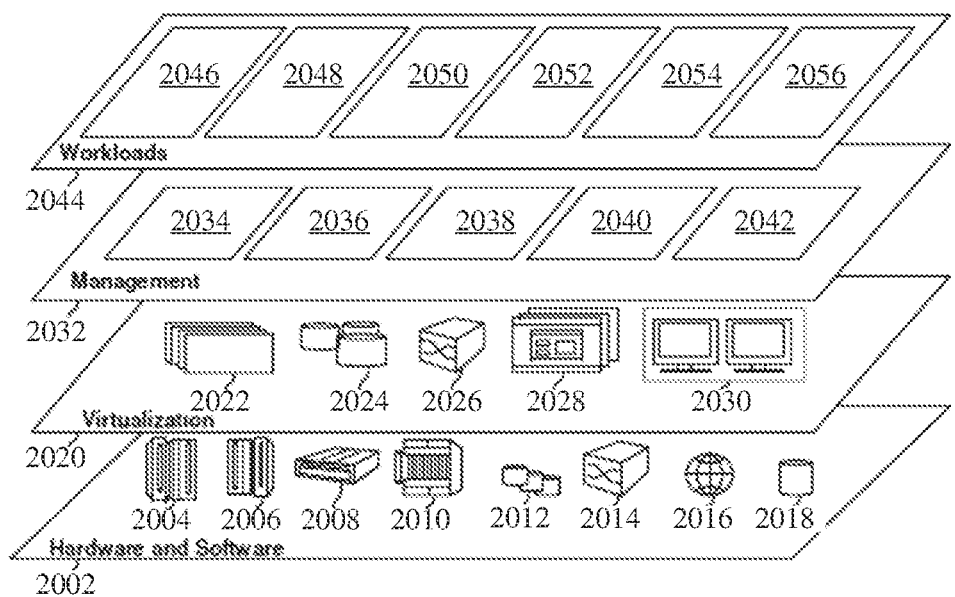
FIG. 20 illustrates example, non-limiting abstraction model layers in accordance with one or more embodiments described herein.

Referring now to FIG. 20, a set of functional abstraction layers provided by cloud computing environment 1900 (FIG. 19) is shown. Repetitive description of like elements employed in other embodiments described herein is omitted for sake of brevity. It should be understood in advance that the components, layers, and functions shown in FIG. 20 are intended to be illustrative only and embodiments of the invention are not limited thereto. As depicted, the following layers and corresponding functions are provided.

Hardware and software layer 2002 includes hardware and software components. Examples of hardware components include: mainframes 2004; RISC (Reduced Instruction Set Computer) architecture based servers 2006; servers 2008; blade servers 2010; storage devices 2012; and networks and networking components 2014. In some embodiments, software components include network application server software 2016 and database software 2018.

Virtualization layer 2020 provides an abstraction layer from which the following examples of virtual entities may be provided: virtual servers 2022; virtual storage 2024; virtual networks 2026, including virtual private networks; virtual applications and operating systems 2028; and virtual clients 2030.

In one example, management layer 2032 may provide the functions described below. Resource provisioning 2034 provides dynamic procurement of computing resources and other resources that are utilized to perform tasks within the cloud computing environment. Metering and Pricing 2036 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2038 provides access to the cloud computing environment for consumers and system administrators. Service level management 2040 provides cloud computing resource allocation and management such that required service levels are met. Service Level Agreement (SLA) planning and fulfillment 2042 provide pre-arrangement for, and procurement of, cloud computing resources for which a future requirement is anticipated in accordance with an SLA.

Workloads layer 2044 provides examples of functionality for which the cloud computing environment may be utilized. Examples of workloads and functions which may be provided from this layer include: mapping and navigation 2046; software development and lifecycle management 2048; virtual classroom education delivery 2050; data analytics processing 2052; transaction processing 2054; and differentially private federated learning processing 2056. Various embodiments of the present invention can utilize the cloud computing environment described with reference to FIGS. 19 and 20 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a computer-readable memory, the computer-executable components comprising:
an input component that accesses a periodic computing task performed by a computing device of the system;
a prime component that:
selects a prime number that is determined to reduce a likelihood of a computing task coincidence of execution of the periodic computing task with execution of at least one other periodic computing task performed by the computing device, and
assigns a time period to the periodic computing task, wherein a duration of the time period is a product of a common tick and the prime number; and
an execution component that periodically executes, via the computing device, the periodic computing task according to the time period.

2. The system of claim 1, wherein the computing device is an electronic control unit of a vehicle.

3. The system of claim 1, wherein the input component further accesses a latency value associated with the periodic computing task, and wherein the prime component selects the prime number so that the duration of the time period is not greater than the latency value.

4. The system of claim 3, wherein the prime component selects the prime number such that a product of the common tick and a next larger prime number exceeds the latency value.

5. The system of claim 3, wherein the prime component assigns the time period based on determining that the latency value is above a threshold.

6. The system of claim 3, wherein the prime component assigns the latency value as the time period based on determining that the latency value is already an integer multiple of the prime number.

7. The system of claim 1, wherein the prime component assigns the time period based on determining that the prime number has not been used to assign another time period to another periodic computing task performed by the computing device.

8. The system of claim 1, wherein the prime component assigns the time period based on determining that the prime number has been used to assign an amount of other time periods to other periodic computing tasks performed by the computing device, wherein the amount is less than a defined threshold.

9. A computer-implemented method, comprising:
accessing, by a system operatively coupled to a processor, a periodic computing task performed by a computing device of the system;
selecting, by the system, a prime number that is determined to reduce a likelihood of a computing task coincidence of execution of the periodic computing task with execution of at least one other periodic computing task performed by the computing device;
assigning, by the system, a time period to the periodic computing task, wherein a duration of the time period is a product of a common tick and the prime number; and
periodically executing, by the system, via the computing device, the periodic computing task according to the time period.

10. The computer-implemented method of claim 9, wherein the computing device is an electronic control unit of a vehicle.

11. The computer-implemented method of claim 9, further comprising:
accessing, by the system, a latency value associated with the periodic computing task, wherein the selecting comprises selecting the prime number so that the duration of the time period is not greater than the latency value.

12. The computer-implemented method of claim 11, wherein the selecting comprises selecting the prime number such that a product of the common tick and a next larger prime number exceeds the latency value.

13. The computer-implemented method of claim 11, further comprising:
determining, by the system, that the latency value is above a threshold, wherein the assigning the time period is based on the determining.

14. The computer-implemented method of claim 11, further comprising:
determining, by the system, that the latency value is already an integer multiple of the prime number, wherein the assigning comprises assigning the latency value as the time period based on the determining.

15. The computer-implemented method of claim 9, further comprising:
determining, by the system, that the prime number has not been used to assign another time period to another periodic computing task performed by the computing device, wherein the assigning the time period is based on the determining.

16. The computer-implemented method of claim 9, further comprising:
determining, by the system, that the prime number has been used to assign an amount of other time periods to other periodic computing tasks performed by the computing system, wherein the amount is less than a defined threshold, and the assigning the time period is based on the determining.

17. A computer program product that facilitates computing task coincidence reduction via prime scheduling, the computer program product comprising a computer-readable storage medium having program instructions embodied therewith, the program instructions executable by a processor to cause the processor to:
access a periodic computing task performed by a computing device;
select a prime number that is determined to reduce a likelihood of a computing task coincidence of execution of the periodic computing task with execution of at least one other periodic computing task performed by the computing device;
assign a time period to the periodic computing task, wherein a duration of the time period is a product of a common tick and the prime number; and
periodically execute, via the computing device, the periodic computing task according to the time period.

18. The computer program product of claim 17, wherein the computing device is an electronic control unit of a vehicle.

19. The computer program product of claim 17, wherein the program instructions are further executable to cause the processor to:
access a latency value associated with the periodic computing task, wherein the selecting comprises selecting the prime number so that the duration of the time period is not greater than the latency value.

20. The computer program product of claim 19, wherein the selecting comprises selecting the prime number such that a product of the common tick and a next larger prime number exceeds the latency value.

\* \* \* \* \*